United States Patent
Kutz et al.

(10) Patent No.: US 10,038,489 B2
(45) Date of Patent: Jul. 31, 2018

(54) SYSTEM AND METHOD FOR ADAPTIVE DEMODULATION OF CELLULAR DEVICE COMMUNICATIONS

(71) Applicant: Ceva D.S.P. Ltd., Herzlia Pituach (IL)

(72) Inventors: Gideon Kutz, Ramat Hasharon (IL); Hagay Rozin, Raanana (IL); Zeev Kaplan, Karmiel (IL); Jeffrey Allan (Alon) Jacob (Yaakov), Raanana (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 0 days.

(21) Appl. No.: 15/399,156

(22) Filed: Jan. 5, 2017

(65) Prior Publication Data
US 2018/0191420 A1    Jul. 5, 2018

(51) Int. Cl.
H04W 4/00      (2018.01)
H04B 7/06      (2006.01)
H04B 7/0417    (2017.01)

(52) U.S. Cl.
CPC ......... H04B 7/0697 (2013.01); H04B 7/0417 (2013.01)

(58) Field of Classification Search
None
See application file for complete search history.

(56) References Cited

U.S. PATENT DOCUMENTS

| 8,867,999 B2 | 10/2014 | Agrawal et al. | |
| 2004/0081260 A1* | 4/2004 | Matsusaka | H04L 1/0003 375/340 |
| 2014/0177762 A1* | 6/2014 | Gotman | H04L 27/0008 375/340 |
| 2014/0453510 | 6/2014 | Gomadam et al. | |
| 2015/0009964 A1 | 1/2015 | Ellenbeck et al. | |
| 2015/0156785 A1* | 6/2015 | Park | H04L 1/00 370/329 |
| 2015/0171947 A1* | 6/2015 | Sun | H04W 4/08 370/329 |
| 2015/0270917 A1* | 9/2015 | Roman | H04J 11/005 370/329 |

(Continued)

FOREIGN PATENT DOCUMENTS

| WO | WO 2014/160984 | 10/2014 |
| WO | WO 2016/082040 | 6/2016 |

OTHER PUBLICATIONS

Guangxia Zhou et al. "Efficient Maximum Likelihood Detection with Imperfect Channel State Information for Interference-limited MIMO Systems" Published in SCC 2015; 10th International ITG Conference on Systems, Communications and Coding. pp. 1-6 Feb. 2-5, 2015 in Hamburg, Germany.

(Continued)

Primary Examiner — Minh-Trang Nguyen
(74) Attorney, Agent, or Firm — Pearl Cohen Zedek Latzer Baratz LLP

(57) ABSTRACT

Systems and methods for adaptive demodulation of cellular device communications signals are provided. Cellular communications over a Long Term Evolution network can involve determining a demodulations scheme based on a service cell transmission mode, an interfering cell transmission mode, a modulation order (QAM) of interferer and an interference-to-noise ratio of cellular communications signals.

9 Claims, 20 Drawing Sheets

(56) References Cited

U.S. PATENT DOCUMENTS

2015/0271830 A1* 9/2015 Shin ................... H04L 1/206
370/329
2015/0372778 A1* 12/2015 Xu ..................... H04J 11/005
370/329
2016/0374098 A1 12/2016 Jongren et al.

OTHER PUBLICATIONS

"The Mobile Broadband Standard" Overview of 3GPP release 12 V0.2.0 pp. 1-296; Sep. 2015.
Extend European Search Report for EP App. No. 18 15 0375 dated May 11, 2018.

* cited by examiner

Receiving a cellular communication signal transmitted over a LTE network  210

Determining a serving cell transmission mode of the cellular communication signal  220

Determining an interfering cell transmission mode of the cellular communication signal  230

Determining a modulation order (QAM) of a interferer of the cellular communication signal  240

Selecting a demodulation scheme from a plurality of demodulation schemes based on the serving cell transmission mode, the interfering cell transmission mode, the modulation order (QAM) of interferer, and an interference-to-noise ratio  250

Demodulating the cellular communication signal with the selected demodulated coding scheme.  260

SYSTEM AND METHOD FOR ADAPTIVE DEMODULATION OF CELLULAR DEVICE COMMUNICATIONS

FIELD OF THE INVENTION

The invention relates generally to wireless communications systems. In particular, the invention relates to selecting a demodulation scheme for cellular communication signals, the demodulation scheme based on a serving cell transmission mode, an interfering cell transmission mode, and/or a modulation order (QAM) of the interferer and an interference-to-noise ratio ("INR") during transmission of the cellular communication system.

BACKGROUND

Various standards for wireless communication are known, for example, to ensure interoperability between equipment from multiple vendors. The standards typically aim to ensure that an allocated spectrum for the wireless communication system is used efficiently.

One such widely adopted standard is the $3^{rd}$ Generation Partnership Project (3GPP) standard. The 3GPP standard has had many revisions, including an evolution into the Long-Term Evolution (LTE) standards. The LTE standards also continue to evolve, such that there are multiple releases, one of which is the LTE standards Release 12 (e.g., Rel-12).

Network assisted interference cancellation and subtraction ("NAICS") is a feature in LTE standard release 12. User equipment ("UE") with NAICS can allow for substantial suppression of an interfering cell's contribution to a cellular communication signal received at the UE. One way to achieve NAICS is through joint demodulation of a transmission from the serving cell (which can be the desired transmission) with an interfering transmission from the interfering cell, for example, a neighboring interfering base station.

Joint demodulation can require jointly detecting the serving cell and interfering cell transmissions. Joint detection of the serving cell's transmission and the interfering cell's transmission can significantly increases a complexity of demodulation. Demodulation complexity can increase exponentially with the number of multiple input multiple output ("MIMO") layers simultaneously detected. A transmission mode combination can be used to determine the number of layers that to be detected. Table 1 is an example a total number of layers to be detected for various combinations of serving cell and interfering cell transmission modes.

TABLE 1

| Serving cell TM/<br>layers | Interfering TM/<br>layers | Total #<br>Layers |
| --- | --- | --- |
| TM4/1L | TM4/1L | 2 |
| TM4/1L | TM4/2L | 3 |
| TM4/1L | TM2 | 4 |
| TM2 | TM4/1L | 4 |
| TM2 | TM4/2L | 6 |
| TM2 | TM2 | 4 |

In comparison, without NAICS, a UE, employing two Rx antennas, can only require demodulating a maximum of two layers. As the optimal detection scheme that jointly demodulated all MIMO layers is not feasible due to a prohibitive complexity increase, sub-optimal schemes might be used. 3GPP has limited the complexity by specifying that the maximum number of layers in the demodulation is three (the rest are treated as noise). In addition, 3GPP has specified that in NAICS mode, the serving cell always uses quadrature phase shift keying ("QPSK") and one layer.

3GPP has specified several receiver schemes for NAICS; however each receiver scheme performs well in some scenarios and poorly in others. Therefore, it is desirable to find a receiver scheme that performs well in a wide range of scenarios, while enabling the scheme to be implemented with the same hardware and keep the complexity approximately constant.

SUMMARY OF THE INVENTION

According to embodiments of the present invention, there is provided a method for and a cellular device capable of adaptive demodulation of cellular device communication signals.

According to embodiments of the present invention, the method can include receiving, by a computing device, a cellular communication signal transmitted over a Long Term Evolution (LTE) network. The computing device may be a processor within a cellular device. In some embodiments of the invention, the cellular device may have two radio frequency receive antennas.

A serving cell transmission mode and an interfering cell transmission mode of the cellular communication signal may be determined by the computing device. A modulation order (QAM) of an interferer of the cellular communication signal may be determined by the computing device.

A demodulation scheme from a plurality of demodulation schemes may be selected by the computing device based on the serving cell transmission mode, the interfering cell transmission mode, the modulation order (QAM) of interferer, and an interference-to-noise ratio. The computing device may demodulate the cellular communication signal with the selected demodulation scheme.

The plurality of demodulation schemes may include a 3 layer demodulation scheme of the LTE network, 2 layer demodulation scheme of the LTE network, a 2×2 layer of the LTE network, or any combination thereof. The selected demodulation scheme may include a look-up table.

In some embodiments of the invention, the cellular device may include at least two radio frequency receive antennas capable of receiving cellular communication signals transmitted over a Long Term Evolution (LTE) network, and a processor.

The processor can receive the cellular communication from the at least two radio frequency receive antennas; determine a serving cell transmission mode and an interfering cell transmission mode of the cellular communication signal; determine a modulation order (QAM) of a interferer of the cellular communication signal; select a demodulation scheme from a plurality of demodulation schemes based on the serving cell transmission mode, the interfering cell transmission mode, the modulation order (QAM), and an interference-to-noise ratio; and demodulate the cellular communication signal with the selected demodulated coding scheme.

The plurality of demodulation schemes may include a 3 layer demodulation scheme of the LTE network, 2 layer demodulation scheme of the LTE network, a 2×2 layer of the LTE network, or any combination thereof. In some embodiments of the invention, the processor can select the demodulation scheme based on a look-up table.

BRIEF DESCRIPTION OF THE DRAWINGS

The foregoing and other objects, features, and advantages of the present invention, as well as the invention itself, is more fully understood from the following description of various embodiments, when read together with the accompanying drawings.

FIG. 2 is a flow diagram illustrating a method for adaptive demodulation of cellular device communication signals, according to an illustrative embodiment of the invention.

Figure 1:
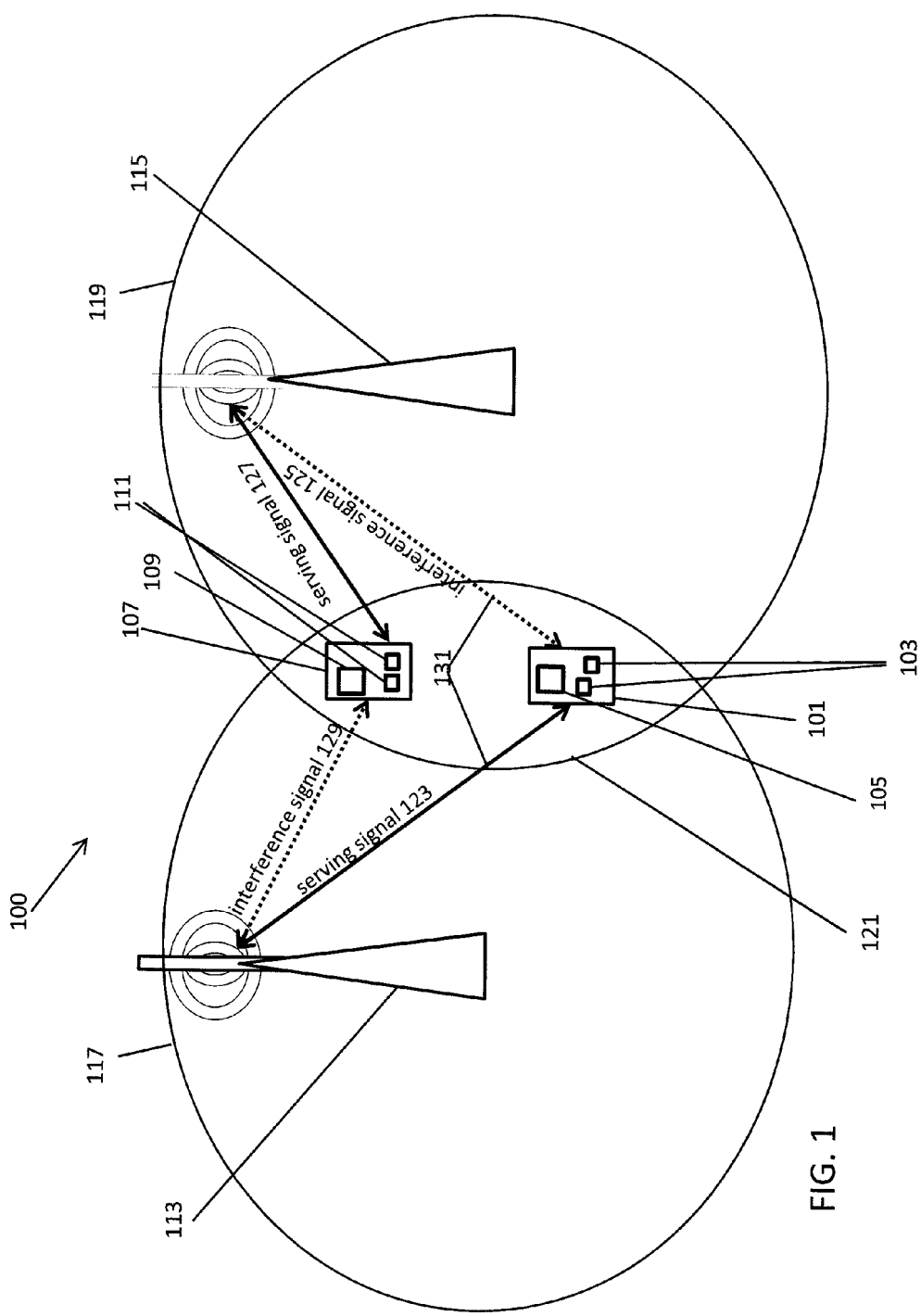
FIG. 1 is a diagram of a cellular communications system, according to an illustrative embodiment of the invention.

It is appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention are described. For purposes of explanation, specific configurations and details are set forth in order to provide a thorough understanding of the present invention. However, it is apparent to one skilled in the art that the present invention may be practiced without the specific details presented herein. Furthermore, well known features may be omitted or simplified in order not to obscure the present invention.

Generally, a user equipment (UE) receives a cellular communications signal from a serving cell (e.g., first base station) and an interfering cell (e.g., a second base station) of a cellular communications Long Term Evolution (LTE) network. A demodulation scheme for the cellular communications signal can be determined based on a serving cell transmission mode, an interfering cell transmission mode, and a modulation order (QAM) of interferer and an inter-ference-to-noise ratio ("INR") of the cellular communication signal. Demodulation can be performed based on the demodulation scheme.

FIG. 1 is a diagram of a cellular communications system 100, according to an illustrative embodiment of the invention. The cellular communications system 100 can include two UEs 101, 107, a serving cell 113, and an interfering cell 115. The UEs 101, 107 can be a personal computer, desktop computer, mobile computer, laptop computer, and notebook computer or any other suitable device such as a cellular telephone, personal digital assistant (PDA), video game console, etc. The UEs 101, 107 can include two or more antennas 103, 111, respectively, for communication. The two or more antennas 103 of the UE 101 can be radio frequency receive antennas capable of receiving cellular communication signals transmitted, for example, over a LTE network.

The serving cell 113 and the interfering cell 115 can each have a corresponding coverage area, shown in FIG. 1 as cellular coverage areas 117, 119 respectively. The cellular coverage areas 117, 119 can overlap to form an interference area 121, in which the UEs 101, 107 can be located. The serving cell 113 and the interfering cell 115 can transmit cellular communications signals to the UEs 101, 107. The UEs 101, 107 can transmit cellular communication signals to the serving cell 113 and the interfering cell 115.

The UE 101 can be configured to receive cellular communication signals 123, 125 from one or more the cells 113, 115 when the UE 101 is within the respective cellular coverage area(s) 117, 119. The UE 101, the serving cell 113, and/or the interfering cell 115, can be configured according to LTE standards. The UE 110, the serving cell 113 and/or the interfering cell 115 can be configured in accordance with any cellular communication standards as is known in the art.

During operation, the at least two antennas 103 of the UE 101 can receive cellular communications signals. The cellular communication signals can include a serving cell signal 123 from the serving cell 113. In addition to being within the cellular coverage area 117, covered by serving cell 113, the UE 101 is also within the cellular coverage area 119, covered by the interfering cell 115. Not only the serving signal 123 from the serving cell 113, but also the interfering signal 125 from the interfering cell 115 can contribute to the cellular communication signals received by the UE 101 in the overlapping coverage area 121.

The UE 101 can determine a transmission mode of the cellular communication signal 123 of the serving cell 113, determine a transmission mode of the cellular communication signal 125 of the interfering cell 115, and/or determine a modulation order (QAM) of interferer and an interference-to-noise ratio ("INR") of the cellular communication signals 123, 125. An MCS index value is a unique reference number defined by modulation type, and/or coding rate ("CR"). The MCS can define the modulation types to be QPSK, quadrature amplitude modulation (QAM) 16, 64QAM, or any combination thereof. The coding rate can be an indication of how much of the data stream is actually being used to transmit usable data. The coding rate can be related to the number of parity bits added to information bits in order to enable correction when errors occur in the information bits.

The UE 101 can select a demodulation scheme from a plurality of demodulation schemes based on the serving cell's 113 transmission mode, the interfering cell's 115 transmission mode, and/or the modulation order (QAM) of interferer and the INR. The UE 101 can demodulate the cellular communication signals 123, 125 with the selected demodulated coding scheme. In some embodiments, the demodulation scheme includes a 3 layer demodulation scheme of the LTE network, a 2 layer demodulation scheme of the LTE network, and a 2×2 layer of the LTE network, or any combination thereof.

In some embodiments, the UE 101 is configured to determine a MCS interferer, and select a demodulation scheme based on the MCS interferer. In some embodiments, the UE 101 is configured to determine an interference-to-noise ratio ("INR"), and select a demodulation scheme based on the INR. The UE 101 can be configured to utilize a look-up table to determine the demodulation scheme where the parameters used in the selection process are a TM combination, a modulation order (QAM) of the interferer, and an INR.

As is apparent to one of ordinary skill in the art, FIG. 1 is an example only and there are many configurations in a cellular network that can cause a UE 101 to receive cellular communications signals with interference. The cellular communication systems 100 can have any number of cells and any number of UEs as is known in the art. Size of the cell coverage area can vary based on properties of the cell.

FIG. 2 a flow diagram 200 illustrating a method for adaptive demodulation of a computing device's (e.g., the UE 101, as shown above in FIG. 1) communication signals (e.g., the serving signal 123, and the interfering signal 125, as shown above in FIG. 1) in LTE networks, according to an illustrative embodiment of the invention.

The method involves receiving a cellular communication signal transmitted over a LTE network (e.g., serving cell 113 and interfering cell 115, as described above in FIG. 1) (Step 210). The cellular communication signal y can be determined as follows:

$$y = Hx + n \qquad \text{Eqn.1}$$

where:
- y is a vector of the received samples.
- H is the channel estimation matrix, also referred to as the channel equivalent matrix.
- x is a vector of the transmitted symbols, both for the interfering cell and the serving cell
- n is a vector of noise samples.

The channel, H, can be a concatenation of the serving cell contribution and interfering cell contribution such that:

$$H = [H_s H_I] \qquad \text{EQN. 2}$$

where $H_s$ can be the channel estimation matrix representing the serving cell contribution to the signal, and $H_I$ can be the channel estimation matrix representing the interfering cell contribution to the signal.

The algorithm can be described to introduce a notation for the column of the matrix H such that:

$$H = [h_0 \ldots h_{N-1}] \qquad \text{EQN. 3}$$

where $h_i$ is the i-th column of the matrix H.

The exact content of y, H, and x can depend on the serving cell transmission mode and a hypothesis of the interfering cell transmission mode.

A hypothesis can refer to a combination of transmission parameters including, for example, modulation type, Pa, PMI/RI and/or TM. The transmission parameters may include, for example, modulation type, e.g., quadrature phase-shift keying (QPSK), 16 Quadrature amplitude modulation (QAM), 64QAM, 256QAM, power ratio (Pa), combinations of precoding schemes (PMI) and layers (RI), referred to herein as PMI/RI, and transmission mode (TM), and many other parameters. Transmission modes numbers used herein, as well as other definitions of parameters, including levels of Pa, refer to the definitions in LTE Rel-12.

While the transmission parameters of the serving cell can be made available to the computing device by transmitting them as part of the control channels information, in some scenarios, not all of the interfering cell's parameters are transmitted to the computing device. For example, the following parameters of the interfering cell may be transmitted to the computing device: Cell identity number (Cell ID), Cell-specific reference signals antenna port (CRS AP), Multicast-broadcast single-frequency network (MBSFN) configuration, Demodulation Reference Signal (DMRS) or CRS based TM.

In some embodiments of the invention, transmission modes of serving cell and interfering cell may include:
- serving cell: TM2; interfering cell TM2 (referred to hereinafter as TM2/TM2);
- serving cell: TM2; interfering cell TM9 (referred to hereinafter as TM2/TM9);
- serving cell: TM9; interfering cell TM2 (referred to hereinafter as TM9/TM2);
- serving cell: TM9; interfering cell TM9; rank (RI)=1 (referred to hereinafter as TM9/TM9)

Selecting the best hypothesis may include repeating demodulation of each sub-carrier for each hypothesis, using the transmission parameters of the specific hypothesis, and calculating a measure of likelihood that the hypothesis is correct for each hypothesis. The measure of likelihood may be combined, e.g., accumulated or averaged, over sub-carriers and the most probable hypothesis, e.g., the hypothesis having the largest combined measure of likelihood, may be selected. Theoretically, the demodulation and the calculation of the measure of likelihood may have to be repeated as many times as there are different hypotheses.

Typically, each hypothesis can have a channel estimation matrix. However, the form of the channel estimation matrix may be common to similar combination modes. For example, channel estimation matrices of TM2/TM2 may all have the same form as EQN. 4 presented below; however, the values of $h_{s,i,j}$ and $h_{I,i,j}$ may be different for different Pa levels. For simplicity, the signal model for a pair of sub-carriers can be rewritten to be numbered 0 and 1.

Signal parameters can be described as follows:
- $y_{i,l}$ is an observation for the 1-th sub carrier and i-th receive antenna.
- $k_{s,i,j}$ is the channel estimation for the serving cell, for the j-th Tx antenna (for TM2) or j-th layer (for TM9) and i-th receive antenna.
- $h_{I,i,j}$ is the channel estimation for the interfering cell, for the j-th Tx antenna (for TM2) or j-th layer (for TM9) and i-th receive antenna.
- $x_{s,j}$ is the transmitted symbol from the serving cell, for the j-th subcarrier.
- $x_{I,j}$ is the transmitted symbol from interfering cell
- n is the vector of noise samples.

Using the above notations, the basic signal model can take the following forms, depending on the combination of transmission modes (an asterisk sign "*" represents a complex conjugated value):

TM2/TM2:

$$\begin{bmatrix} y_{0,0} \\ y_{0,1}* \\ y_{1,0} \\ y_{1,1}* \end{bmatrix} = \begin{bmatrix} h_{s,0,0} & h_{s,0,1} & h_{I,0,0} & h_{I,0,1} \\ -h_{s,0,1}* & h_{s,0,0}* & -h_{I,0,1}* & h_{I,0,0}* \\ h_{s,1,0} & h_{s,1,1} & h_{I,1,0} & h_{I,1,1} \\ -h_{s,1,1}* & h_{s,1,0}* & -h_{I,1,1}* & h_{I,1,0}* \end{bmatrix} \begin{bmatrix} x_{s,0} \\ x_{s,1}* \\ x_{I,0} \\ x_{I,1}* \end{bmatrix} + n \qquad \text{EQN. 4}$$

TM2/TM9:

$$\begin{bmatrix} y_{0,0} \\ y_{0,1}* \\ y_{1,0} \\ y_{1,1}* \end{bmatrix} = \begin{bmatrix} h_{s,0,0} & h_{s,0,1} & h_{I,0,0} & 0 \\ -h_{s,0,1}* & h_{s,0,0}* & 0 & h_{I,0,0}* \\ h_{s,1,0} & h_{s,1,1} & h_{I,1,0} & 0 \\ -h_{s,1,1}* & h_{s,1,0}* & 0 & h_{I,1,0}* \end{bmatrix} \begin{bmatrix} x_{s,0} \\ x_{s,1}* \\ x_{I,0} \\ x_{I,1}* \end{bmatrix} + n \qquad \text{EQN. 5}$$

TM9/TM2:

$$\begin{bmatrix} y_{0,0} \\ y_{0,1}* \\ y_{1,0} \\ y_{1,1}* \end{bmatrix} = \begin{bmatrix} h_{s,0,0} & 0 & h_{I,0,0} & h_{I,0,1} \\ 0 & h_{s,0,0}* & -h_{I,0,1}* & h_{I,0,0}* \\ h_{s,1,0} & 0 & h_{I,1,0} & h_{I,1,1} \\ 0 & h_{s,1,0}* & -h_{I,1,1}* & h_{I,1,0}* \end{bmatrix} \begin{bmatrix} x_{s,0} \\ x_{s,1}* \\ x_{I,0} \\ x_{I,1}* \end{bmatrix} + n \qquad \text{EQN. 6}$$

TM9/TM9:

$$\begin{bmatrix} y_{0,0} \\ y_{0,1}* \\ y_{1,0} \\ y_{1,1}* \end{bmatrix} = \begin{bmatrix} h_{s,0,0} & 0 & h_{I,0,0} & 0 \\ 0 & h_{s,0,0}* & 0 & h_{I,0,0}* \\ h_{s,1,0} & 0 & h_{I,1,0} & 0 \\ 0 & h_{s,1,0}* & 0 & h_{I,1,0}* \end{bmatrix} \begin{bmatrix} x_{s,0} \\ x_{s,1}* \\ x_{I,0} \\ x_{I,1}* \end{bmatrix} + n \qquad \text{EQN. 7}$$

EQN. 4-7 were shown for unity of the description. The matrix for TM9/TM9 can be divided into two distinct sub-carriers leading to:

$$\begin{bmatrix} y_{0,0} \\ y_{1,0} \end{bmatrix} = \begin{bmatrix} h_{s,0,0} & h_{I,0,0} \\ h_{s,1,0} & h_{I,1,0} \end{bmatrix} \begin{bmatrix} x_{s,0} \\ x_{I,0} \end{bmatrix} + n \qquad \text{EQN. 8}$$

$$\begin{bmatrix} y_{0,1} \\ y_{1,1} \end{bmatrix} = \begin{bmatrix} h_{s,0,1} & h_{I,0,1} \\ h_{s,1,1} & h_{I,1,1} \end{bmatrix} \begin{bmatrix} x_{s,1} \\ x_{I,1} \end{bmatrix} + n \qquad \text{EQN. 9}$$

The method can involve determining, by a computing device a serving cell transmission mode of the cellular communication signal (Step 220).

The method can involve determining, by a computing device an interfering cell transmission mode of the cellular communication signal (Step 230). As described above, while the transmission parameters of the serving cell can be made available to the computing device by transmitting them as part of the control channels information, in some scenarios, not all of the interfering cell's parameters are transmitted to the computing device.

For example, the following parameters of an interfering cell may be transmitted to the computing device: Cell identity number (Cell ID), Cell-specific reference signals antenna port (CRS AP), Multicast-broadcast single-frequency network (MBSFN) configuration, Demodulation Reference Signal (DMRS) and/or CRS based TM. Thus, there can be a need to blindly estimate some of the transmission parameters of the interfering cell.

In some embodiments of the invention, the computing device receives information regarding the interfering cell transmission mode from the serving cell via separate signaling, for example, through Radio Resource Control (RRC) layer signaling, or through direct indication. In some embodiments of the invention, the computing device receives a small subset of transmission modes that the interfering cell uses for all PDSCH transmission. In some embodiments of the invention, the computing device a NAICS feature specification determines a set of transmission related parameters explicitly delivered to the UE about the interfering cell, and the computing device estimates the rest of the parameters by using blind estimation methods of parameter estimation. The method can involve determining, by a computing device a modulation order (QAM) of interferer and an INR of the cellular communication signal (Step 240). In some embodiments of the invention, the serving cell signals the modulation order (QAM) of interferer and the INR of the interfering signal to the computing device. In some embodiments of the invention, the computing device knows the MCS of the serving cell, but the computing device estimates the INR, and the computing device blindly estimates the modulation order (QAM) of the interferer.

The method can involve selecting, by the computing device a demodulation scheme from a plurality of demodulation schemes based on the serving cell (e.g., 113, as described above in FIG. 1) transmission mode, the interfering cell (e.g., 115, as described above in FIG. 1) transmission mode, the modulation order (QAM) of interferer, and the INR (Step 250), found in a blind parameter estimation phase.

The computing device can use the 3layers modulation scheme when the serving cell transmission mode is TM2 and the interfering cell transmission mode is TM2; when the serving cell transmission mode is TM2 and the interfering cell transmission mode is TM3; or when the serving cell transmission mode is TM4 and the interfering cell transmission mode is TM2.

In some embodiments, when the 3layers demodulation scheme is used, the computing device uses a pre-processing procedure called "whitening" where the computing device demodulates a maximum of 3 layers together, and the computing device transforms the rest of the layers' input vectors into white noise vectors.

In some embodiments, a plurality of whitening filters may be calculated. As used herein, a whitening filter can refer to a filter that when applied to the channel model, e.g., the channel model of EQN. 1, can transform all other channels of the interfering cell, except for a single channel of the interfering cell into a white noise. Each whitening filter may be dependent on the transmission mode combination; however, a single whitening filter may fit more than one transmission mode combination.

For transmission mode combinations TM2/TM9, TM2/TM2 or TM9/TM2 the updated noise correlation matrix, $R_n$, may be given by:

$$R_n = h_{int} h_{int}^H + S \qquad \text{EQN. 10}$$

Where S is the noise correlation matrix that represents the contribution of noise and other cells, except for the interfering cell we wish to cancel, and where $h_{int}$ in equation 10 represents any column of the interfering cell in the signal model, e.g., $h_2$ or $h_3$. The operand $A^H$ represents the conjugate transpose of a matrix (or vector) A. It is noted that any column of the interfering cell may be whitened.

For transmission mode combination TM9/TM9 there are no additional layers to cancel and the updated noise correlation matrix, $R_n$, may equal the noise correlation matrix, S:

$$R_n = S \qquad \text{EQN. 11}$$

The whitening filter may be calculated using any whitening transform, for example, by Cholesky decomposition, such that:

$$LL^H = R_n \qquad \text{EQN. 12}$$

In some embodiments of the invention, at least one whitening filter may be calculated to cover all relevant transmission mode combinations. For example, a first whitening filter may be calculated for transmission mode combinations TM2/TM9, TM2/TM2 or TM9/TM2 by applying the Cholesky decomposition given in equation 12 on the noise correlation matrix given in equation 13, and a second whitening filter may be calculated for transmission mode combination TM9/TM9 by applying the Cholesky decomposition given by in equation 12 on the noise correlation matrix given in equation 11.

The whitening filters may be applied on the channel model, where the appropriate whitening filter is applied to each channel model. For example, the whitening filter that is calculated for the updated noise correlation matrix given by equation 10 may be applied to the signal model of TM2/TM9 given by equation 5, to the signal model of TM2/TM2 given by equation 3 and to the signal model of TM4/TM2 given by equation 6. The whitening filter that is calculated for the updated noise correlation matrix given by equation 11 may be applied to the signal model of TM9/TM9 given by equation 7.

After applying a whitening filter, a new channel model is:

$$y_w = H_w x + w \qquad \text{EQN. 13}$$

Where $y_w$ is the whitened received sample:

$$y_w = L^{-1} y \qquad \text{EQN. 14}$$

$H_w$ is the whitened channel estimation matrix:

$$H_w = L^{-1}[h_0 h_1 h_2] \text{ or } H_w = L^{-1}[h_0 h_1] \quad \text{EQN. 15}$$

Depending on the number of columns (layers) post whitening, as described above. w is the whitened noise:

$$w = L^{-1} n \quad \text{EQN. 16}$$

In some embodiments of the invention, the measure of likelihood may be or may include a probability metric, which is a measure of the probability that a certain hypothesis is the correct hypothesis, or a logarithm of the probability metric, also referred to as log-probability. According to some embodiments, the log-probabilities may be calculated for each hypothesis. The log-probability for a hypothesis representing the k-th modulation may be calculated by:

$$Q(n,l) = \max_{x_0, x_1 \in \{M_0\}, x_2 \in \{M_k\}} -\|y_w - H_w x\|^2 - \log(16|M_k|) - \frac{1}{2}\log(\det(R_n)) - C_k \quad \text{EQN. 17}$$

Where:
n is the hypothesis number.
l is the sub-carrier number.
Q(n,l) is the log-probability for the n-th hypothesis and l-th sub-carrier.
k is the modulation type of the interfering cell, where k=0 represents QPSK, k=1 represents 16QAM, k=2 represents 64QAM, k=3 represents 256QAM.
$x = [x_0, x_1, x_2]^T$ is the symbols vector. The first two elements, $x_0, x_i$, are from the QPSK modulation (k=0) of the serving cell, and the $3^{rd}$ element, $x_2$, belongs to the interference and may have any modulation (k=0-3).
$M_k$ is the group of all symbols in a constellation of the interference for a given modulation k.
$|M_k|$ is the cardinality of $M_k$ (which is the number of symbols in constellation $M_k$).
$\det(R_n)$ is the determinant of the pre-whitened noise correlation matrix $R_n$.
$C_k$ is a correction factor per constellation that compensates using max-log-map approximation instead of log-map.

In some embodiments of the invention, a cumulative hypothesis is calculated, e.g., a single hypothesis metric may be calculated for each tested hypothesis. A cumulative hypothesis metric of a single tested hypothesis may be calculated, for example, based on the measures of likelihood, e.g., the probability metrics or the log-probabilities, of all the sub-carriers of the tested hypothesis.

For example, the measures of likelihood of all the sub-carriers of the tested hypothesis may be aggregated, e.g., if probability metrics are used, the probability metrics of all the sub-carriers of the tested hypothesis may be multiplied, and if log-probabilities are used, the log-probabilities of all the sub-carriers of the tested hypothesis may be accumulated. It should be readily understood that adding log-probabilities is equivalent to multiplying probabilities. However, according to some embodiments, using log-probabilities may be more efficient, or less computationally intensive, since some processors may perform additions more efficiently than multiplications.

Thus, according to some embodiments, log-probabilities of a tested hypothesis may be accumulated across sub-carriers according to:

$$Q(n) = \Sigma_l Q(n,l) \quad \text{EQN. 18}$$

Where Q(n) is the cumulative log-probability for hypothesis n.

In some embodiments of the invention, the most likely hypothesis is selected. For example, the hypothesis having the maximal cumulative hypothesis metric may be selected. According to some embodiments, the most likely hypothesis may be selected according to:

$$n = \underset{n}{\arg\max}\, Q(n) \quad \text{EQN. 19}$$

In some embodiments of the invention, when the 3layers demodulation scheme is used, the first two layers represent the serving cell, and the third layer, transmitted by the interfering cell, represents the interfering cell's parameters according to available parameters and parameters detected in the blind parameters detection phase.

The complexity of the 3layers demodulation scheme can be proportional to the number of states searched raised to the power of the number of demodulated serving cell layers which can be 16. For example, the search is proportional to ($4^2$=16) because, in the 3layers demodulation scheme, two out of the three layers are the serving cell layers which are modulated by QPSK which has four states.

In some embodiments, the computing device uses the 2layers demodulation scheme when the transmission mode for the serving cell and the interfering cell are both TM4 with RI=1. In some embodiments of the invention, when the computing device uses the 2layers demodulation scheme, the computing device can demodulate two layers together.

In some embodiments of the invention, no extra whitening is needed when the computing device uses the 2layers demodulation scheme. In some embodiments of the invention, the first layer in 2layers demodulation scheme represents the serving cell, while the second layer represents the interfering cell. The complexity of the 2layers demodulation scheme can proportional to the number of states searched raised to the power of the number of the demodulated serving cell layers which is 4. For example, the search can be proportional to (4×1=4) because, in the 2layers demodulation scheme, only the first layer is QPSK which has four states.

In some embodiments of the invention, the computing device uses the 2×2layers demodulation scheme in specific conditions in which this scheme is superior. In some embodiments of the invention, the computing device selects the 2×2layers demodulation scheme when both the serving cell transmission mode and interfering cell transmission mode are TM2, the interfering modulation is QPSK, and the interfering cell is stronger than the serving cell by more than 5 dB.

In some embodiments of the invention, the computing device selects the 2×2layers demodulation scheme if the serving cell transmission mode is TM2 while the interfering cell transmission mode is TM9, the interfering modulation is QPSK, and the interfering cell is stronger than the serving cell by more than 9 dB. In some embodiments of the invention, a user can select other conditions for selecting the 2×2layers demodulation scheme, as the selection is done by software in the computing device.

In some embodiments of the invention, the demodulation scheme for 2×2layers includes whitening noise with the serving cell treated as part of the noise. For example, in the 2×2layers demodulation scheme, the above mentioned 2layers demodulation scheme is applied twice. In some embodiments of the invention, the 2×2layers demodulation scheme includes demodulating the two layers of the interfering cell (activating the demodulation twice with switching the order of the layers—Layered Orthogonal Lattice Detector "LORD" style), and whitening the two layers of the serving cell. In some embodiments of the invention, the 2×2layers demodulation scheme includes the computing device finding, based on the log likelihood ratio's (LLR), the mean and variance of the interferer symbols.

As appears in the Eq. 10 above for combination TM2/TM2:

$$\begin{bmatrix} y_{0,0} \\ y_{0,1}* \\ y_{1,0} \\ y_{1,1}* \end{bmatrix} = \begin{bmatrix} h_{s,0,0} & h_{s,0,1} & h_{I,0,0} & h_{I,0,1} \\ -h_{s,0,1}* & h_{s,0,0}* & -h_{I,0,1}* & h_{I,0,0}* \\ h_{s,1,0} & h_{s,1,1} & h_{I,1,0} & h_{I,1,1} \\ -h_{s,1,1}* & h_{s,1,0}* & -h_{I,1,1}* & h_{I,1,0}* \end{bmatrix} \begin{bmatrix} x_{s,0} \\ x_{s,1}* \\ x_{I,0} \\ x_{I,1}* \end{bmatrix} + n \qquad \text{EQN. 20}$$

In some embodiments of the invention, the interfering cell layers while whitening the layers of the serving cell are decoded:

$$R_n^s = h_0 h_0^H + h_1 h_1^H + S \qquad \text{EQN. 21}$$

The Cholesky decomposition may be used:

$$L_s(L_s)^H = R_n^s \qquad \text{EQN. 22}$$

The signal model may be transformed to the following, where $y_w^i$ is the whitened received signal:

$$y_w^i = (L_s)^{-1} y \qquad \text{EQN. 23}$$

$H_w^i$ is the whitened channel estimation matrix for decoding of the interfering cell layers:

$$H_w^i = (L_s)^{-1} [h_2 h_3] \qquad \text{EQN. 24}$$

Soft decoding of 2 layers may produce LLRs for each one of the interfering cell symbols:

$\{LLR(x_{I,0})\}_n$, where n=0 . . . BitsPerQAM$_1$
$\{LLR(x_{I,1})\}_n$, where n=0 . . . BitsPerQAM$_1$
BitsPerQAM$_1$ is derived from the modulation order (QAM) of interferer used by the interfering cell (2 for QPSK, 4 for 16QAM, 6 for 64QAM and 8 for 256QAM)

LLRs calculate probabilities for each one of the symbol in the constellation set may be used:

$$P(\{x_{I,0} = x_i | \{LLR(x_{I,0})\}_n\}) \forall x_i \in M^I \qquad \text{EQN. 25}$$

$M^I$ is the group of all symbols in a constellation of the interference for a given modulation
$|M^I|$ is the cardinality of $M^I$ (which is the number of symbols in constellation $M^I$).

The re-constructed soft symbol for $x_{I,0}$ and variance of the re-constructed symbol may be calculated using the LLRs calculate probabilities:

$$\hat{x}_{I,0} = \sum_{i=0}^{|M^I|-1} x_i \cdot P(\{x_{I,0} = x_i | \{LLR(x_{i,0})\}_n\}) \qquad \text{EQN. 26}$$

$$\text{Var}(\hat{x}_{I,0}) = \sum_{i=0}^{|M^I|-1} x_i^2 \cdot P(\{x_{I,0} = x_i | \{LLR(x_{I,0})\}_n\}) - \hat{x}_{I,0}^2 \qquad \text{EQN. 27}$$

The same procedure may be done for $x_{I,1}$, producing $\hat{x}_{I,1}$ and $\text{Var}(\hat{x}_{I,1})$.

In some embodiments of the invention, decoding of the serving cell layers involves performing soft cancellation:

$$\begin{bmatrix} y_{0,0}^{canc} \\ y_{0,1}^{canc}* \\ y_{1,0}^{canc} \\ y_{1,1}^{canc}* \end{bmatrix} = \begin{bmatrix} y_{0,0} \\ y_{0,1}* \\ y_{1,0} \\ y_{1,1}* \end{bmatrix} - h_2 \hat{x}_{I,0} - h_3 \hat{x}_{I,1} \qquad \text{EQN. 28}$$

The new signal model may be:

$$y^{canc} = \begin{bmatrix} y_{0,0}^{canc} \\ y_{0,1}^{canc}* \\ y_{1,0}^{canc} \\ y_{1,1}^{canc}* \end{bmatrix} = h_0 x_{s,0} + h_1 x_{s,1}^* + n \qquad \text{EQN. 29}$$

The new noise correlation matrix may be:

$$R_n^i = \text{Var}(\hat{x}_{I,0}) h_2 h_2^H + \text{Var}(\hat{x}_{I,1}) h_3 h_3^H + S \qquad \text{EQN. 30}$$

By using Cholesky decomposition $$L_i(L_i)^H = R_n^i \qquad \text{EQN. 31}$$

the signal model can be transformed to the following, where $y_w^s$ is the whitened received signal:

$$y_w^s = (L_i)^{-1} y^{canc} \qquad \text{EQN. 32}$$

$H_w^s$ is the whitened channel estimation matrix for decoding of the serving cell layers:

$$H_w^s = (L_i)^{-1} [h_0 \ h_1] \qquad \text{EQN. 33}$$

The soft-decoding of the 2 layers may be applied using $y_w^s$ and $H_w^s$ which can produce LLRs for each one of the serving cell layers.

In some embodiments of the invention, the 2×2layers demodulation scheme includes multiplying the mean of the interference symbols by the interferer variance. In some embodiments of the invention, the 2×2layers demodulation scheme includes soft subtracting the mean of the interference symbols multiplied by the channel estimation from the antenna inputs.

In some embodiments of the invention, the 2×2layers demodulation scheme includes the computing device whitening the noise with the residual energy of the interfering cell (based on the variance calculated) taken as part of the noise. In some embodiments, the 2×2layers demodulation scheme includes the computing device demodulating the two layers of the serving cell once, then switching the order of the layers and then demodulating a second time. Accordingly, the complexity of the 2×2layers scheme may be proportional to 2×(4×1)=8 which is twice the complexity of the 2layers scheme.

The following table is a summary of the selected demodulation scheme based on the transmission modes ("TM") of the serving cell and interfering cell, the MCS serving, the modulation order (QAM) of the interferer, and the INR.

| TM serving/TM interfering modes | MCS serving | MCS interferer | INR | selected scheme |
|---|---|---|---|---|
| TM2/TM2 | 9 | 5 (QPSK) | Low (3.84 dB) | 3 layers |
| TM2/TM2 | 9 | 5 (QPSK) | High (13.91 dB) | 2 × 2 layers |
| TM2/TM2 | 9 | 14 (16QAM) | Low (3.84 dB) | 3 layers |
| TM2/TM2 | 9 | 14 (16QAM) | High (13.91 dB) | 3 layers |

-continued

| TM serving/TM interfering modes | MCS serving | MCS interferer | INR | selected scheme |
|---|---|---|---|---|
| TM2/TM2 | 9 | 25 (64QAM) | Low (3.84 dB) | 3 layers |
| TM2/TM2 | 9 | 25 (64QAM) | High (13.91 dB) | 3 layers |
| TM2/TM9 | 9 | 5 (QPSK) | Low (3.84 dB) | 2 × 2 layers |
| TM2/TM9 | 9 | 5 (QPSK) | High (13.91 dB) | 3 layers |
| TM2/TM9 | 9 | 14 (16QAM) | Low (3.84d B) | 3 layers |
| TM2/TM9 | 9 | 14 (16QAM) | High (13.91 dB) | 3 layers |
| TM2/TM9 | 9 | 25 (64QAM) | Low (3.84 dB) | 3 layers |
| TM2/TM9 | 9 | 25 (64QAM) | High (13.91 dB) | 3 layers |
| TM4(9)/TM4 | 9 | 5 (QPSK) | Low (3.84 dB) | 2 layers |
| TM4(9)/TM4 | 9 | 5 (QPSK) | High (13.91 dB) | 2 layers |
| TM4(9)/TM4 | 9 | 14 (16QAM) | Low (3.84 dB) | 2 layers |
| TM4(9)/TM4 | 9 | 14 (16QAM) | High (13.91 dB) | 2 layers |
| TM4(9)/TM4 | 9 | 25 (64QAM) | Low (3.84 dB) | 2 layers |
| TM4(9)/TM4 | 9 | 25 (64QAM) | High (13.91 dB) | 2 layers |

In some embodiments, selecting the demodulation scheme includes a look-up table.

The method can involve demodulating, by the computing device, the cellular communication signal with the selected demodulated coding scheme.

In some embodiments, the computing device is a processor within a cellular device. In some embodiments, the cellular device includes two radio frequency receive antennas.

In some embodiments, the method includes determining, by the computing device, a modulation coding scheme interferer, and selecting a demodulation scheme based on the modulation coding scheme interferer. In some embodiments, the method includes determining, by the computing device, an INR, and selecting a demodulation scheme can be further based on the modulation coding scheme interferer.

Figure 3A:
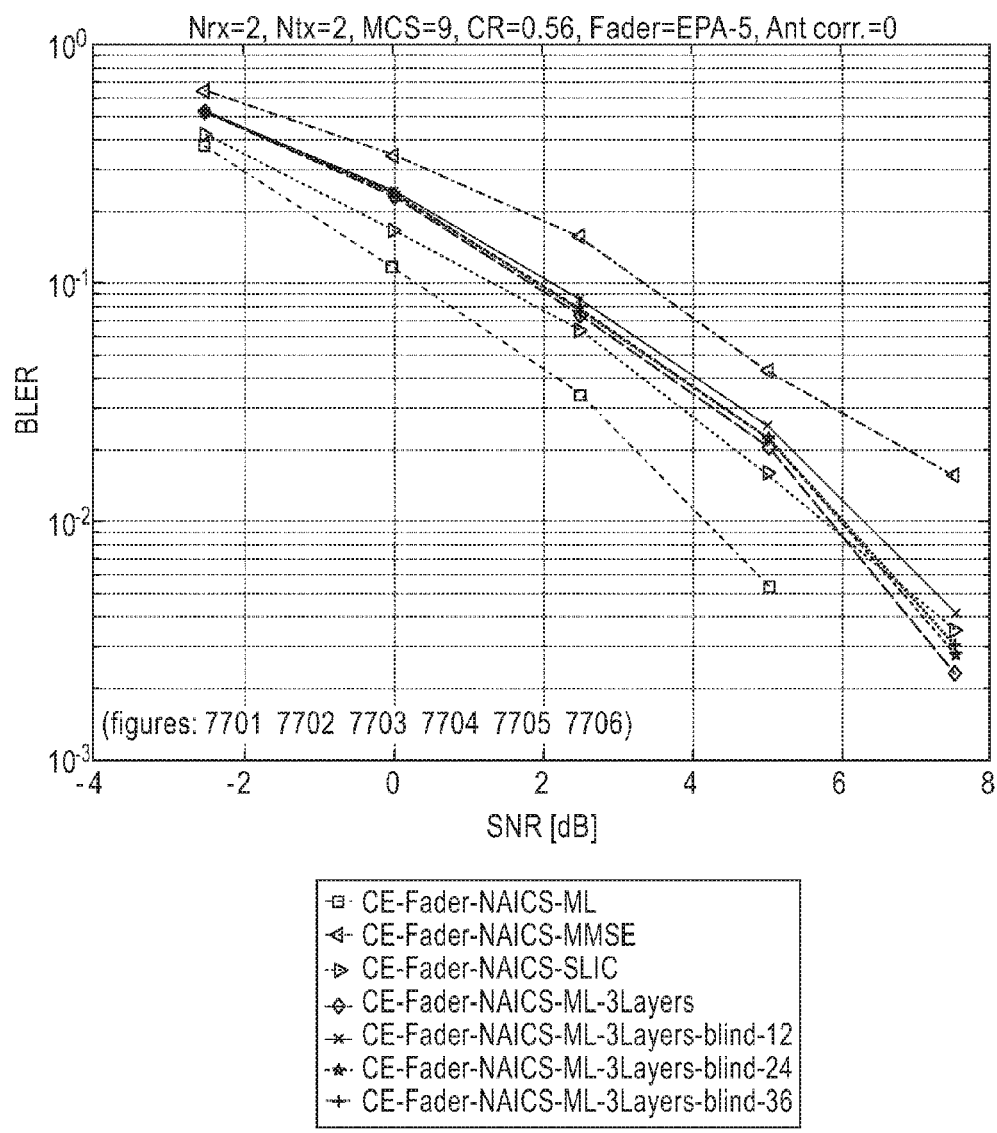
FIGS. 3a-r are graphs illustrating block error rate ("BLER") to signal-to-noise ratio ("SNR") in accordance with illustrative embodiments of the invention.
Figure 3B:
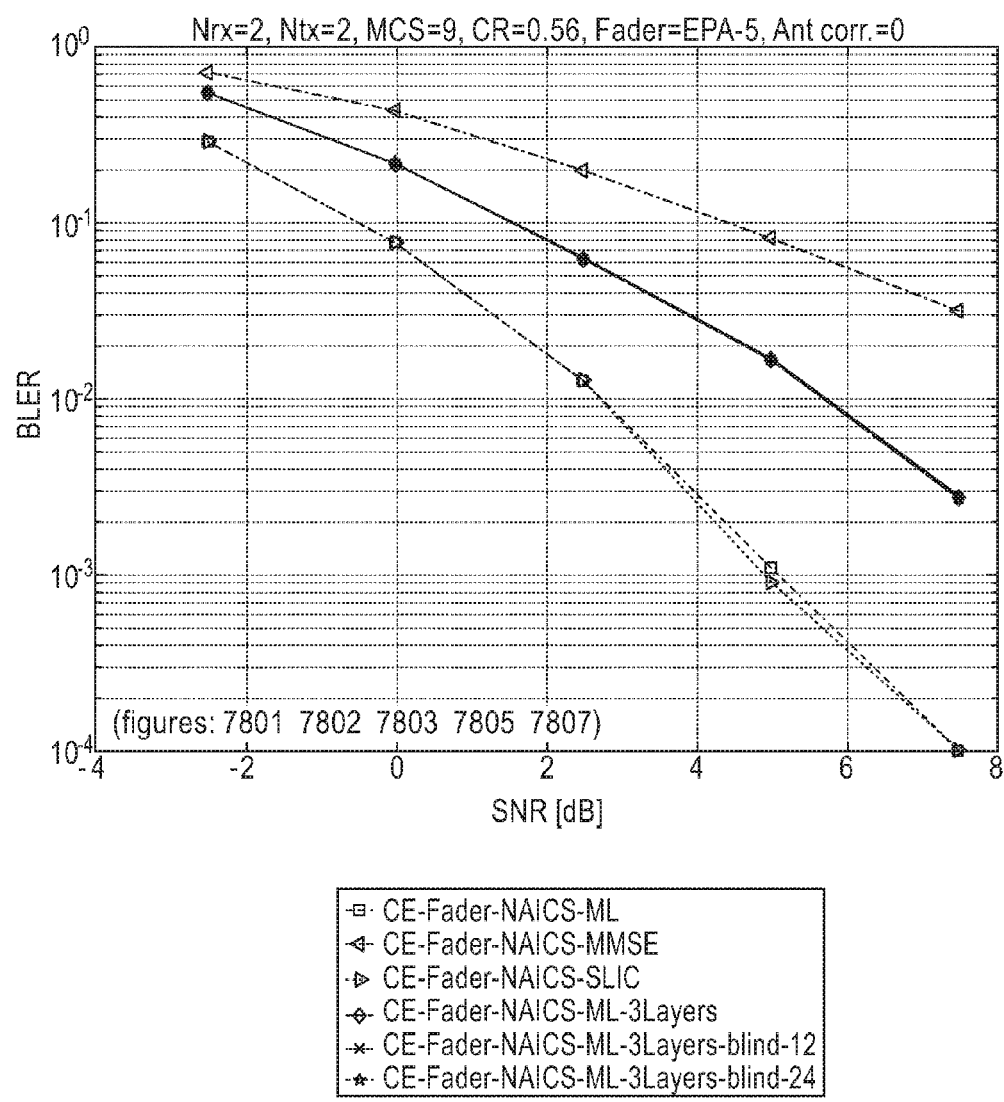
Figure 3C:
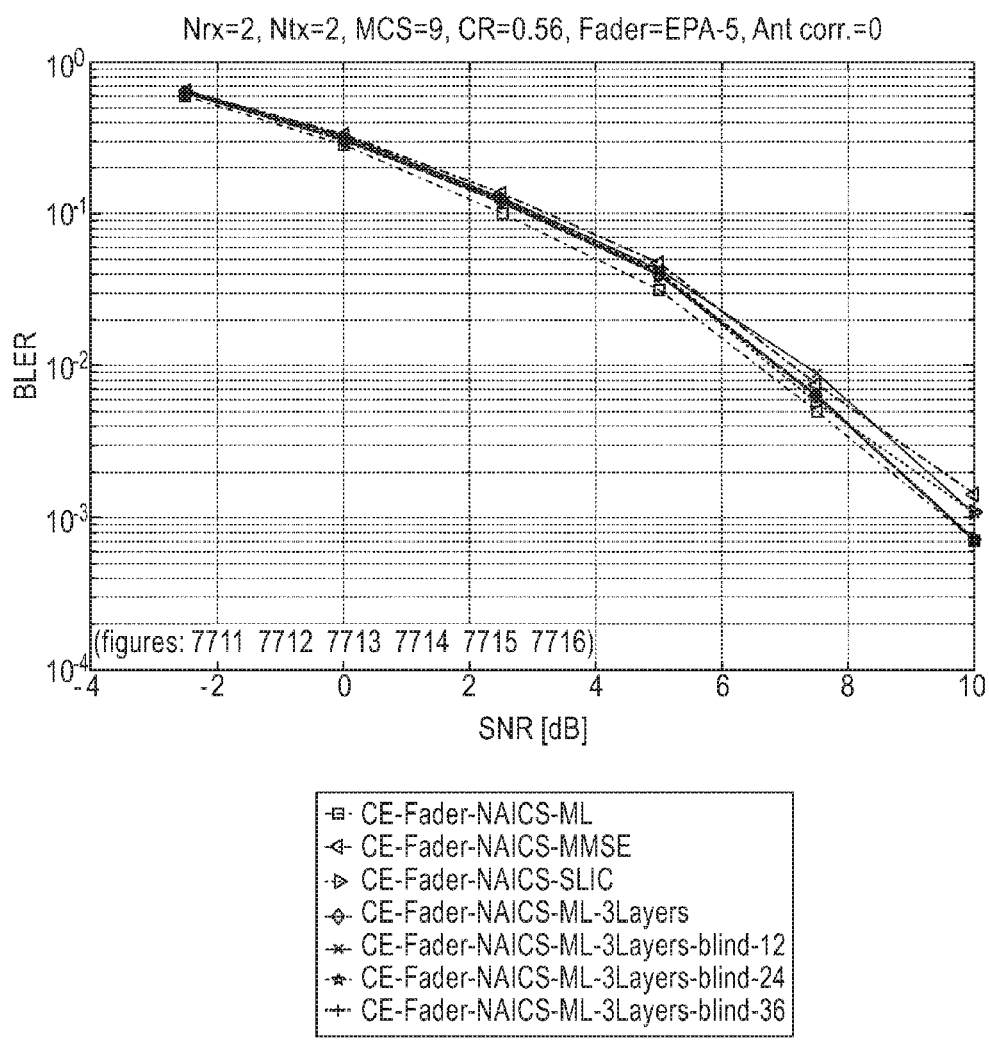
Figure 3D:
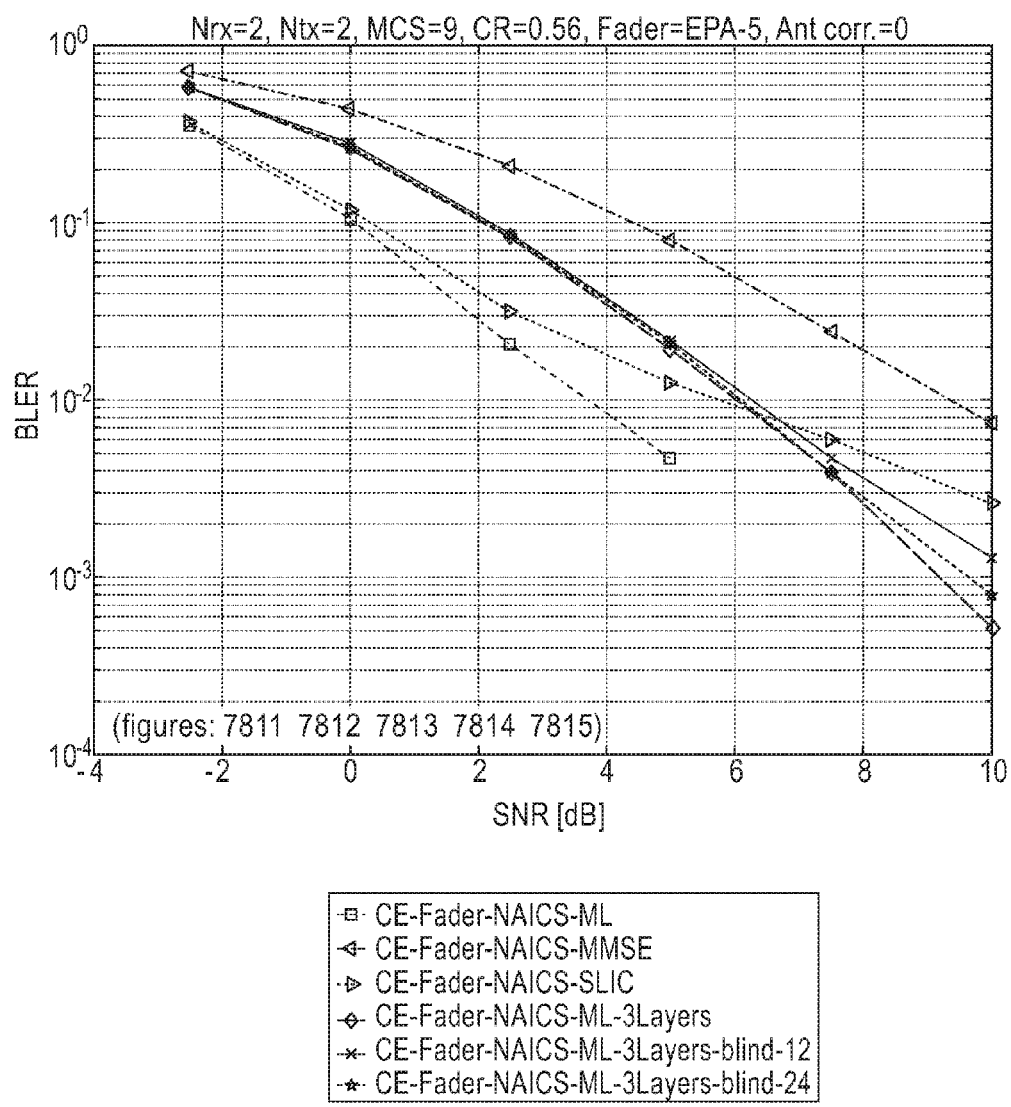
Figure 3E:
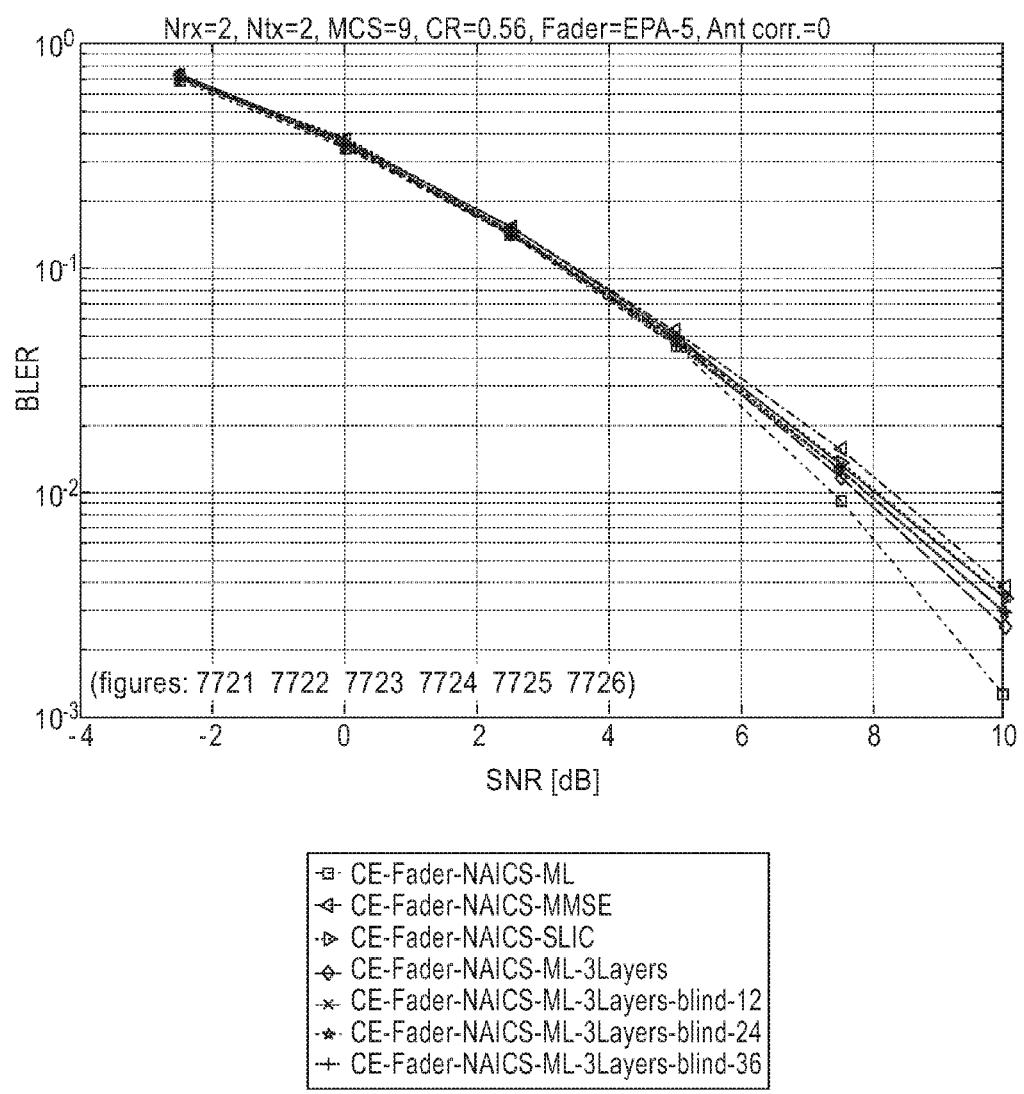
Figure 3F:
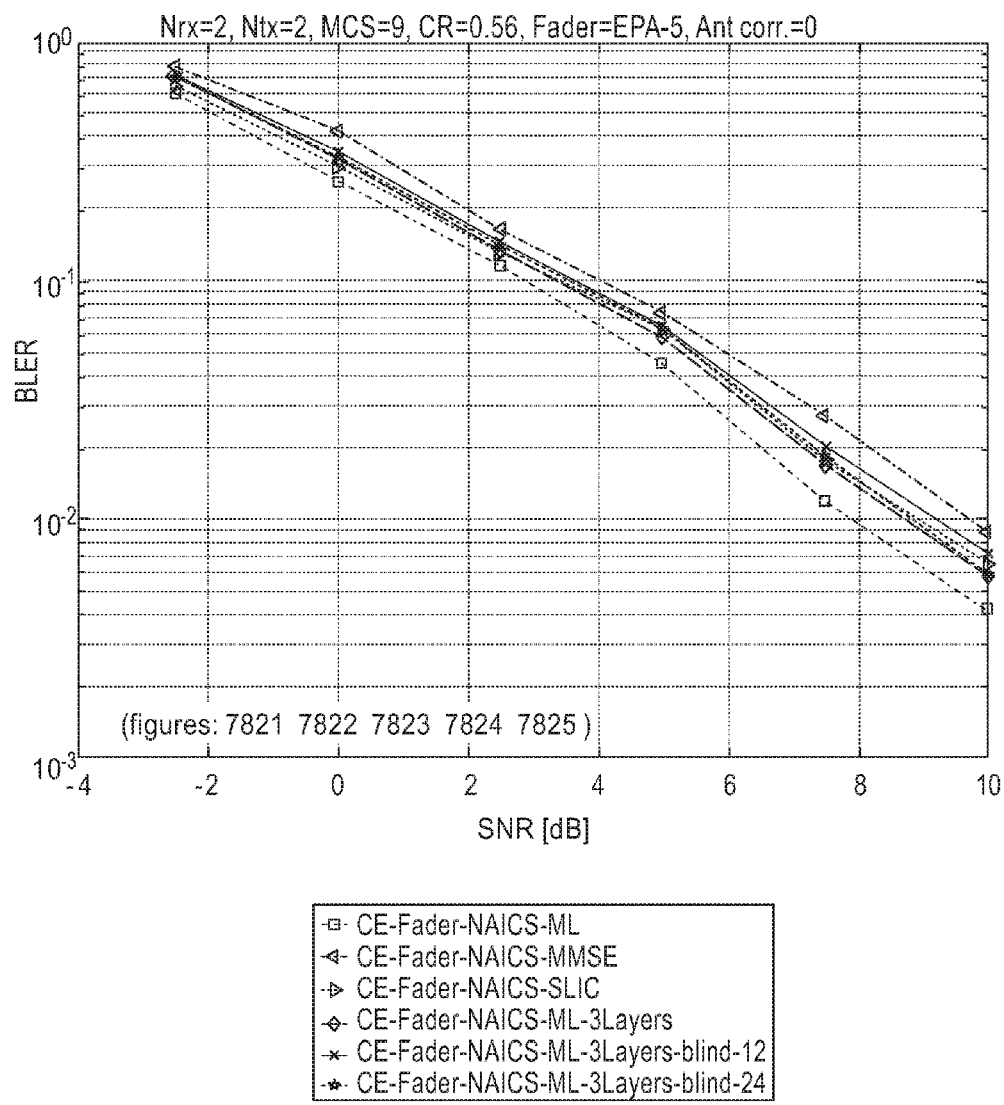
Figure 3G:
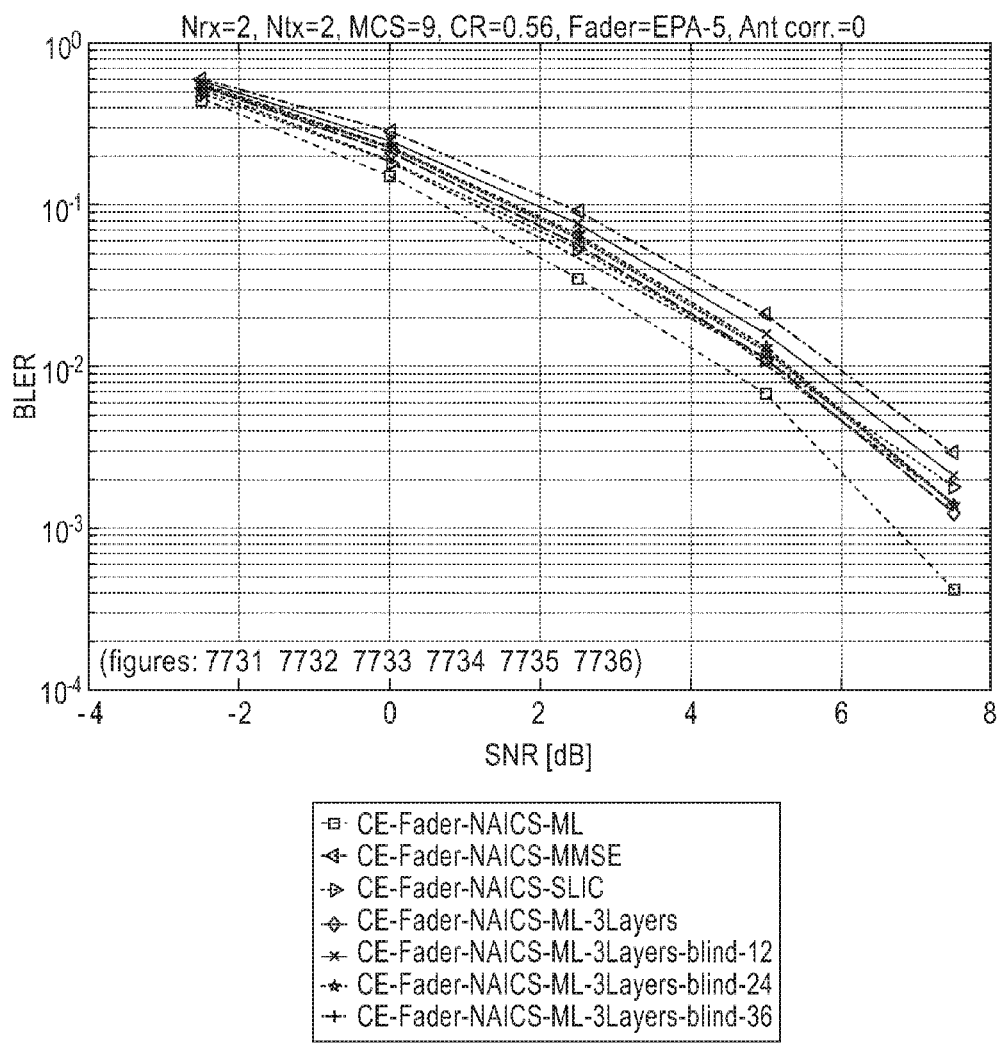
Figure 3H:
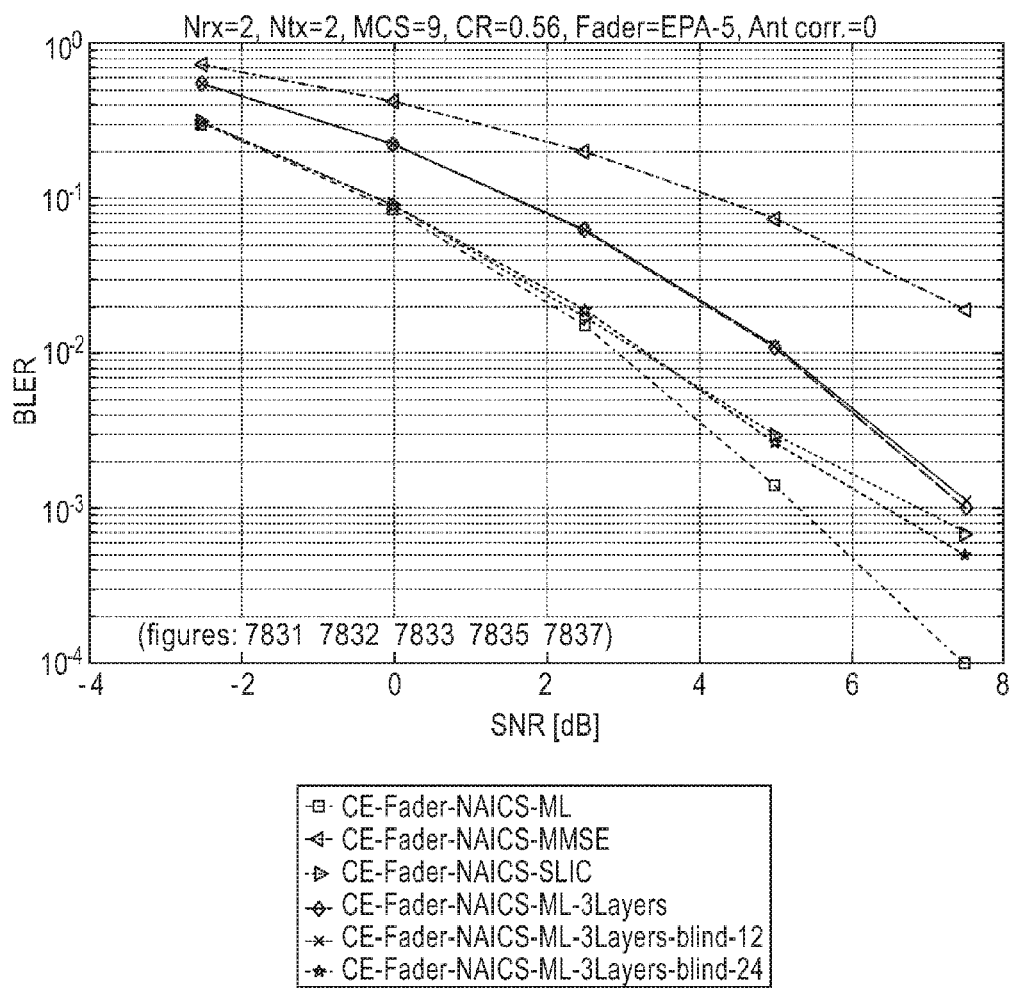
Figure 3I:
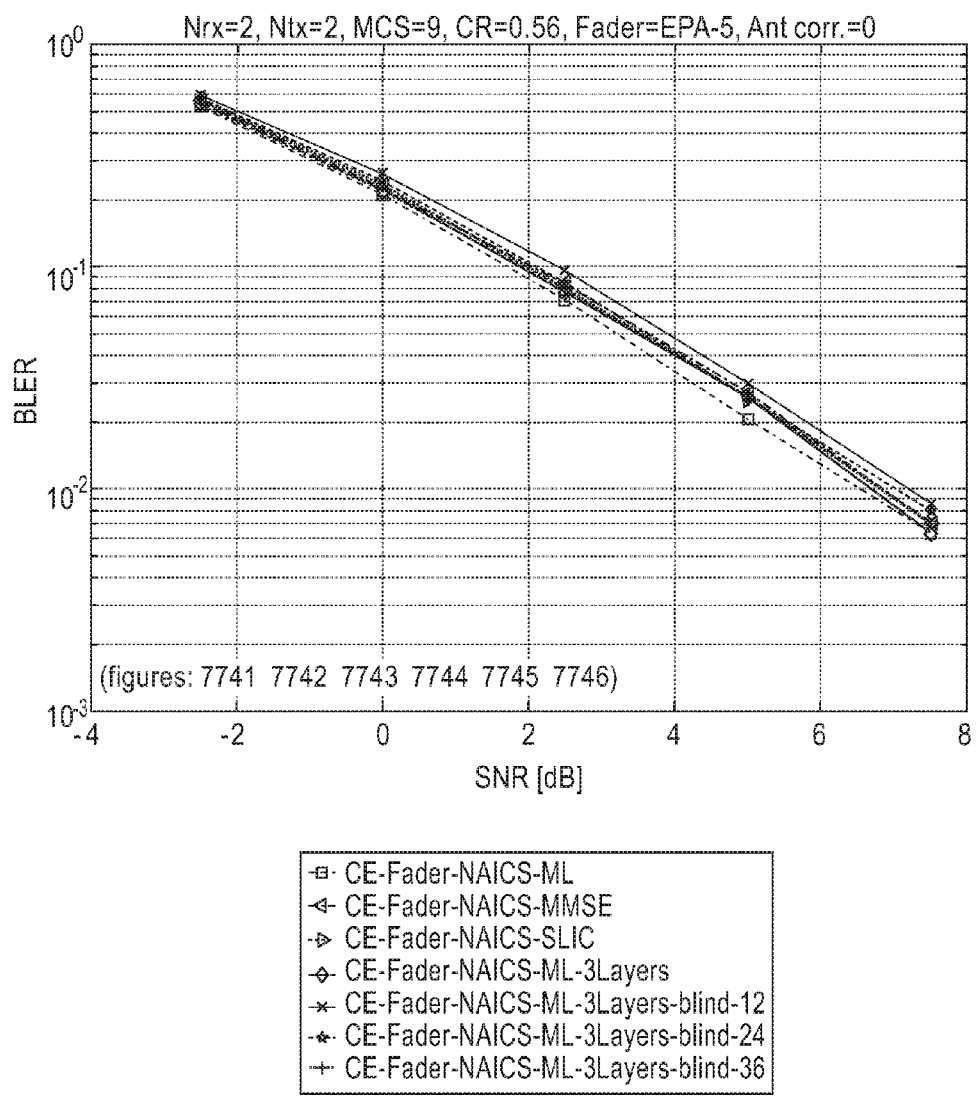
Figure 3J:
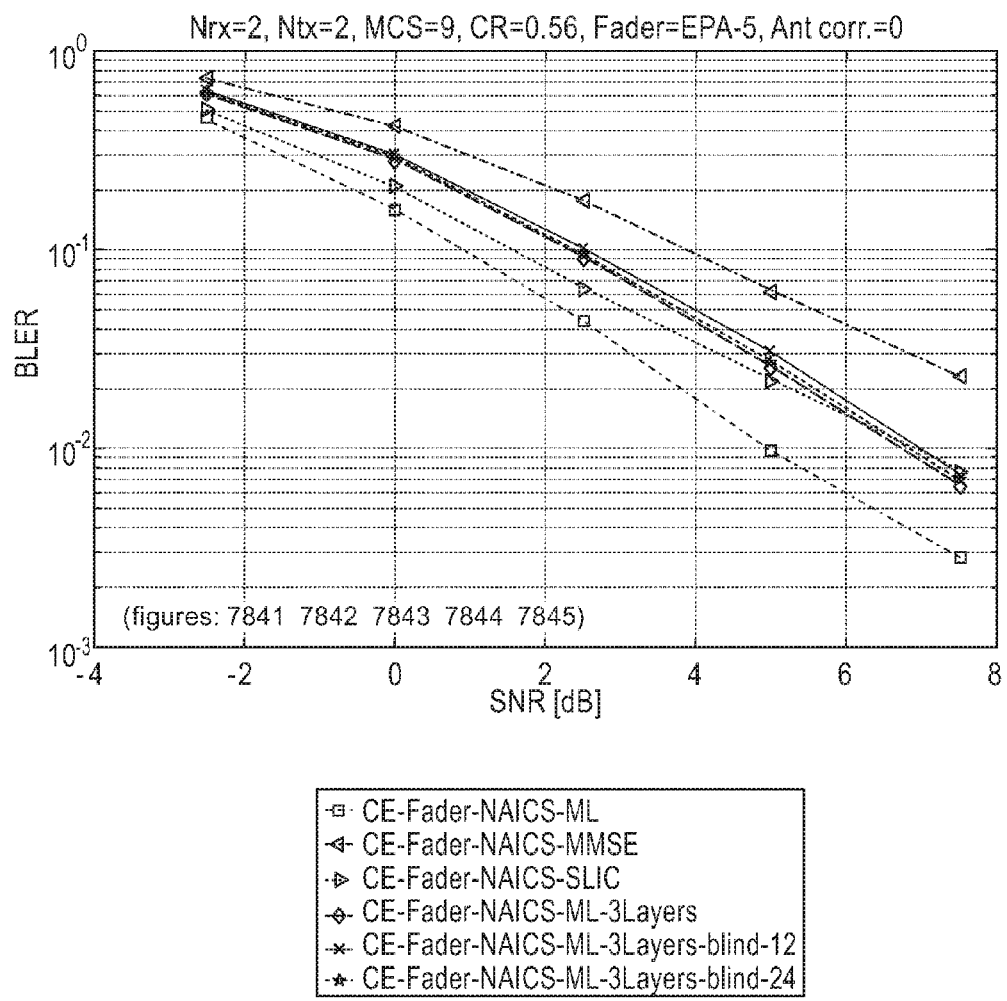
Figure 3K:
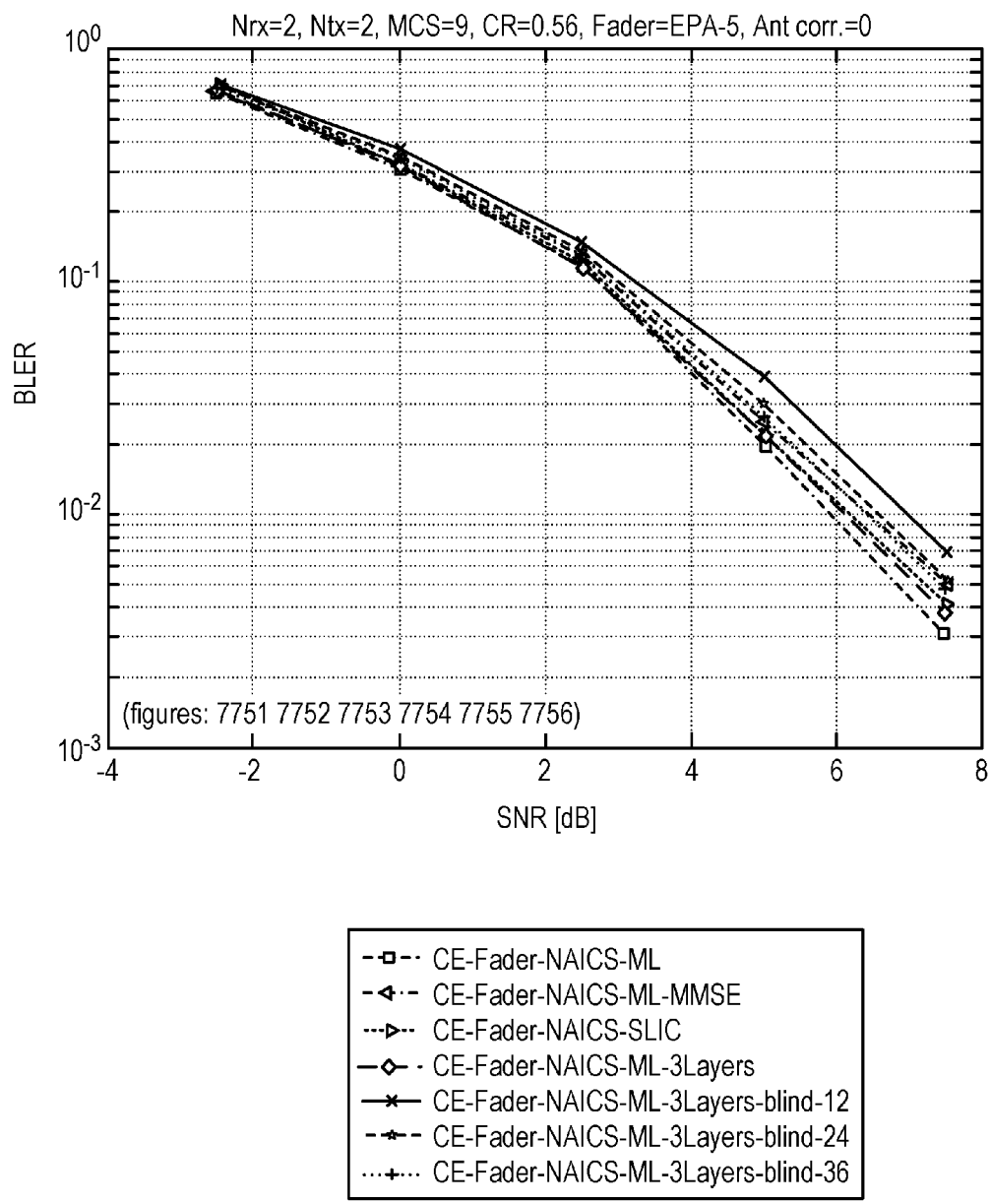
Figure 3L:
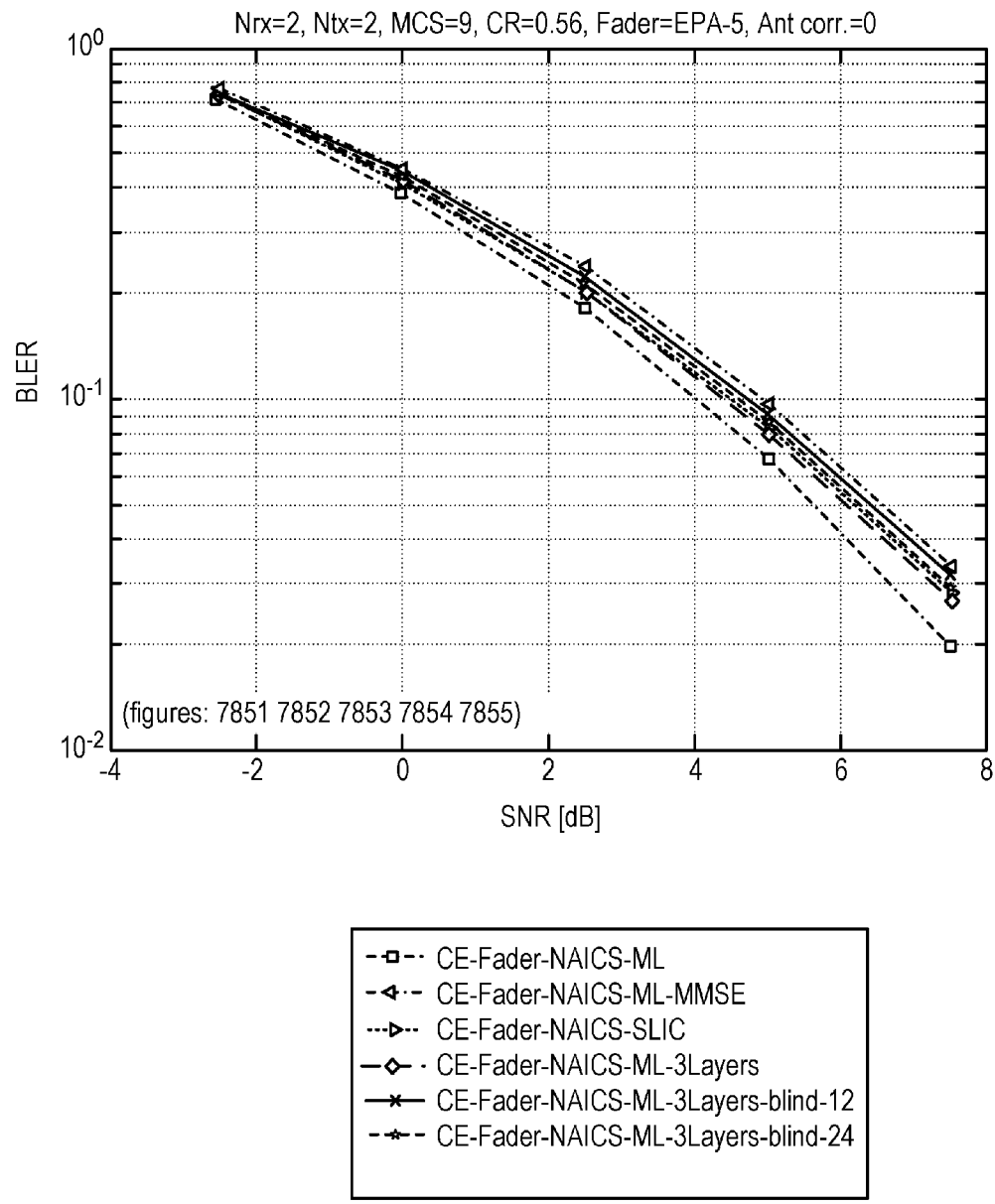
Figure 3M:
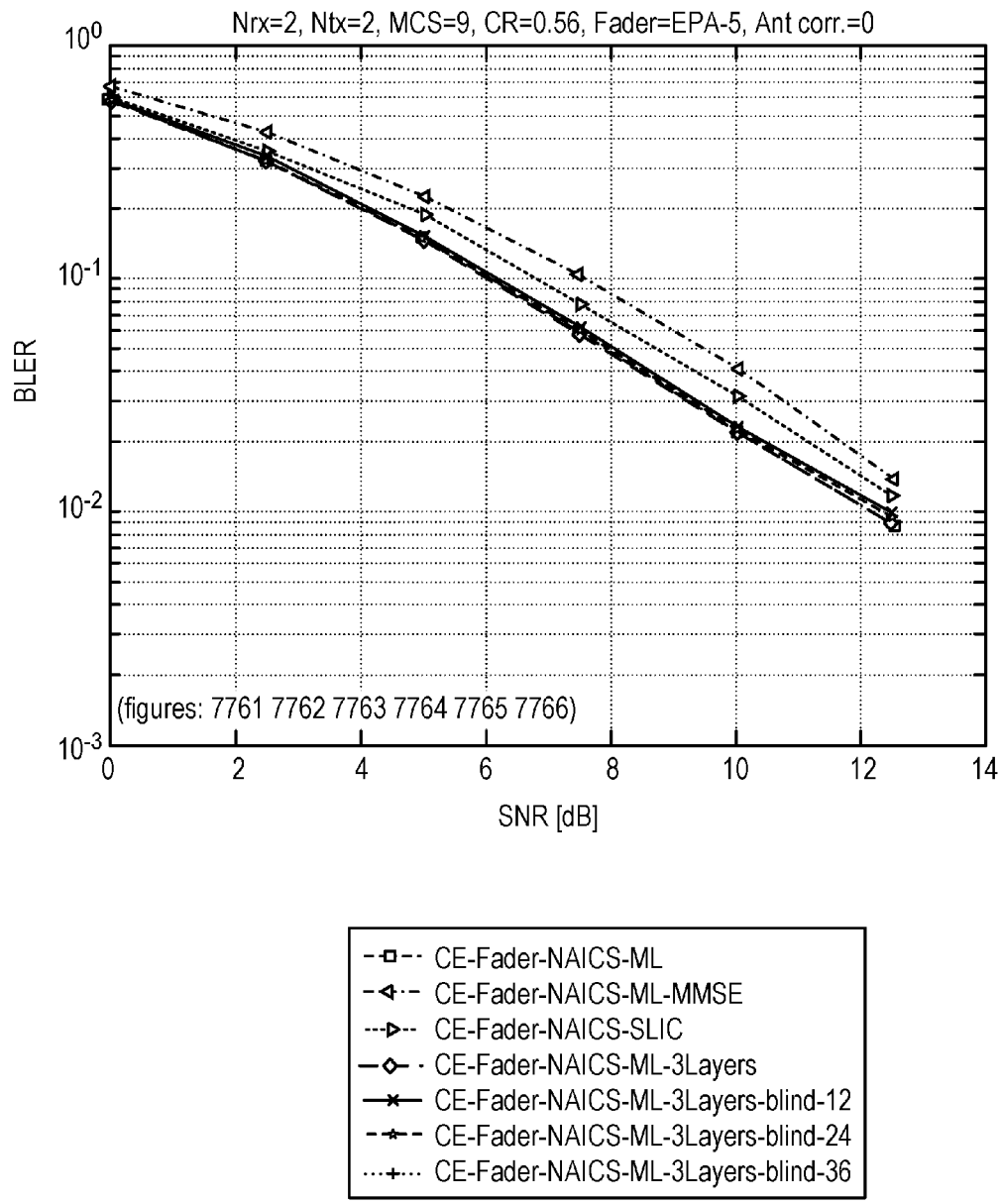
Figure 3N:
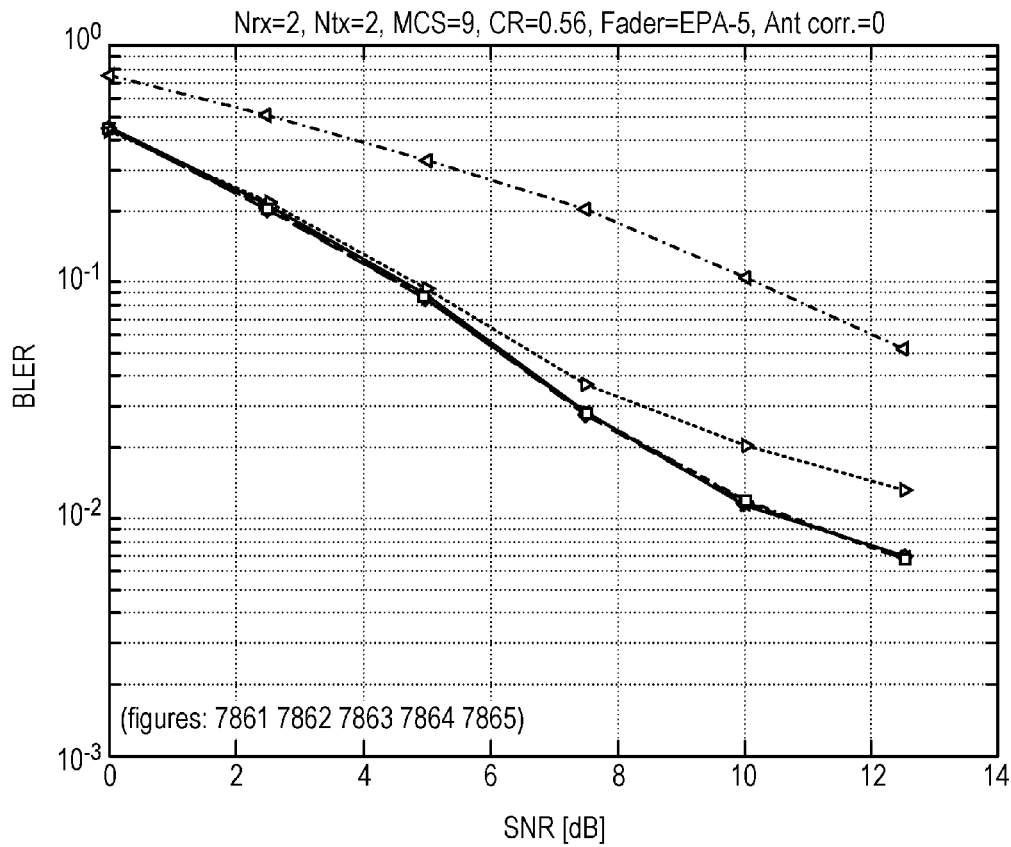
Figure 3O:
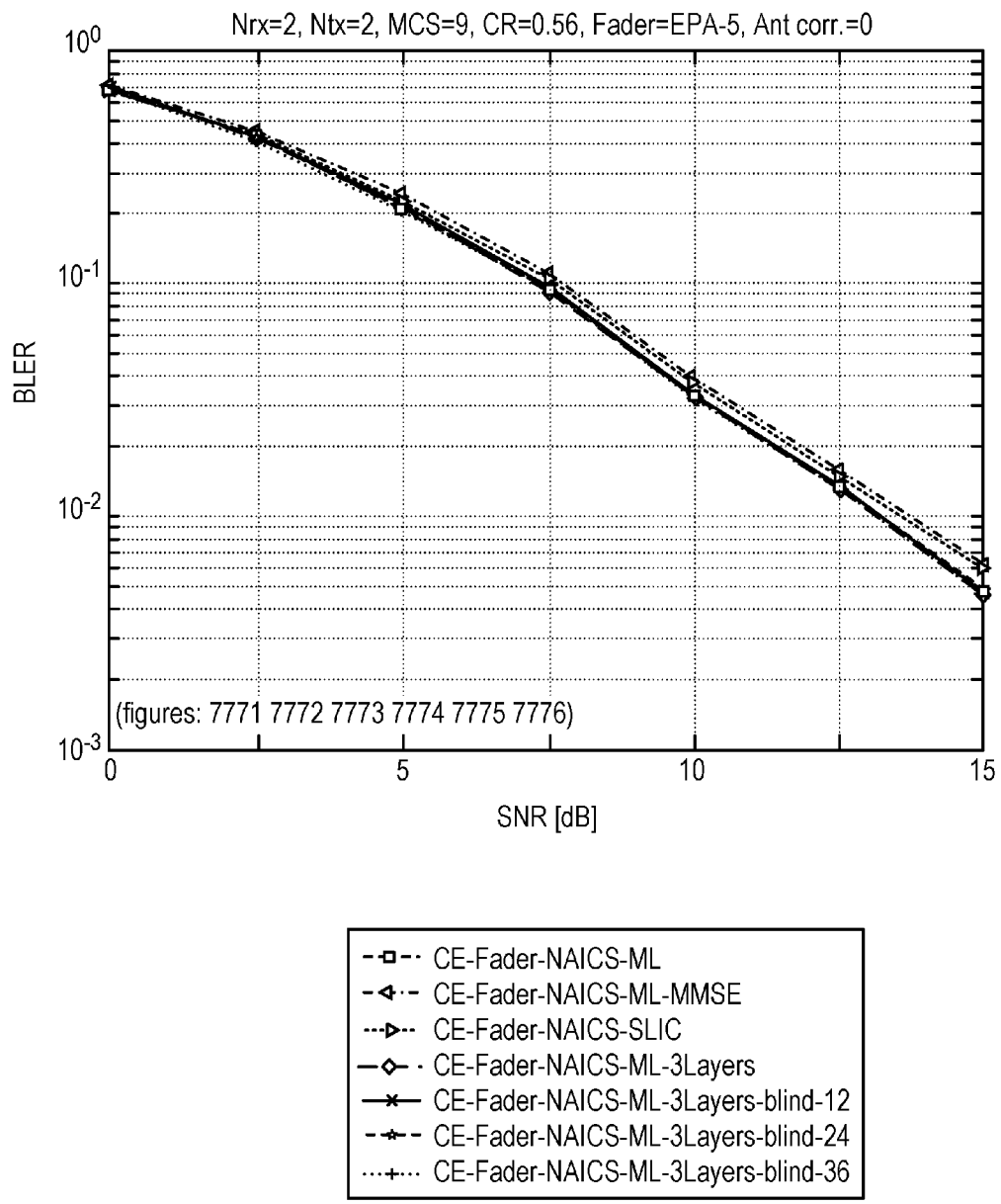
Figure 3P:
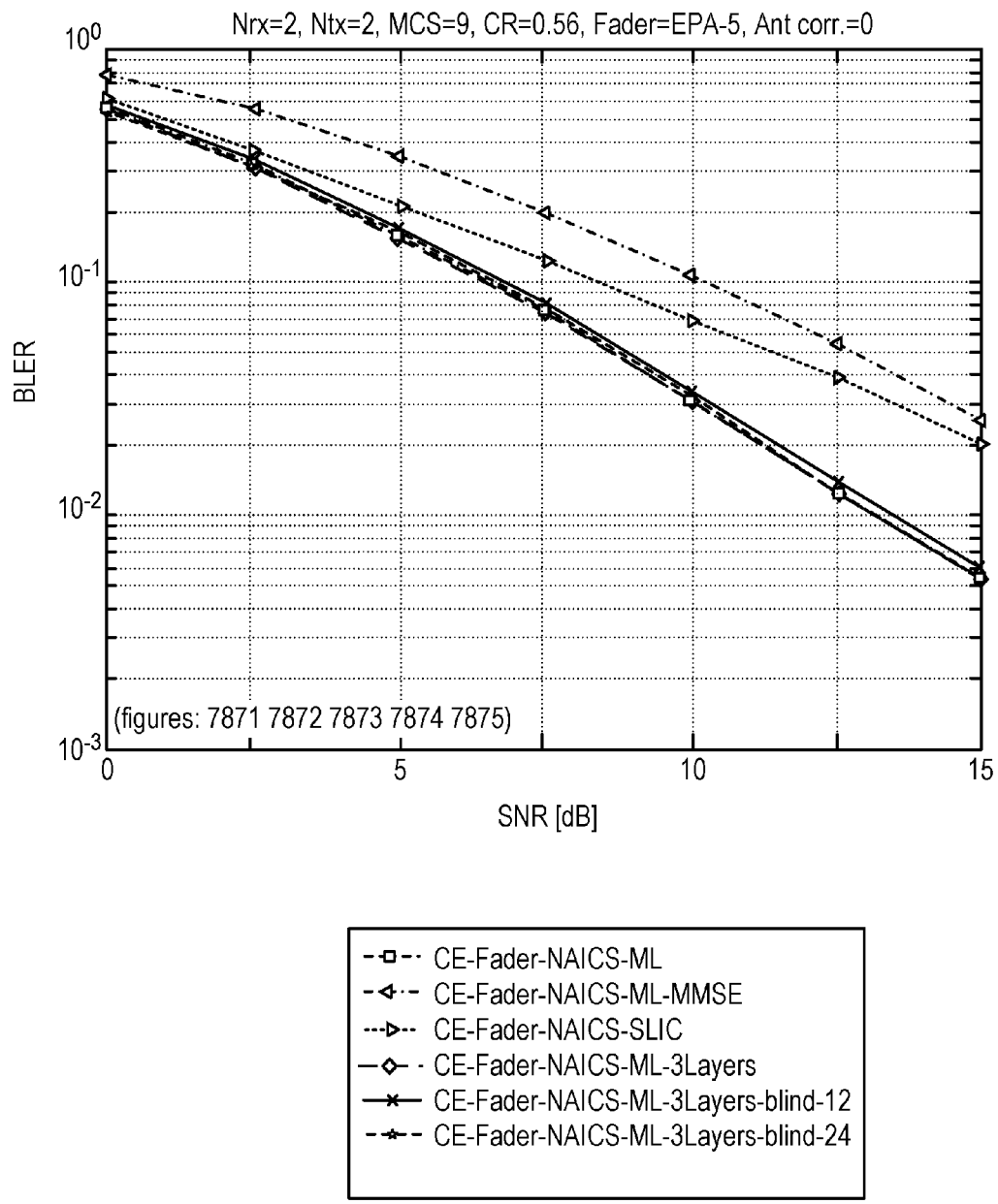
Figure 3Q:
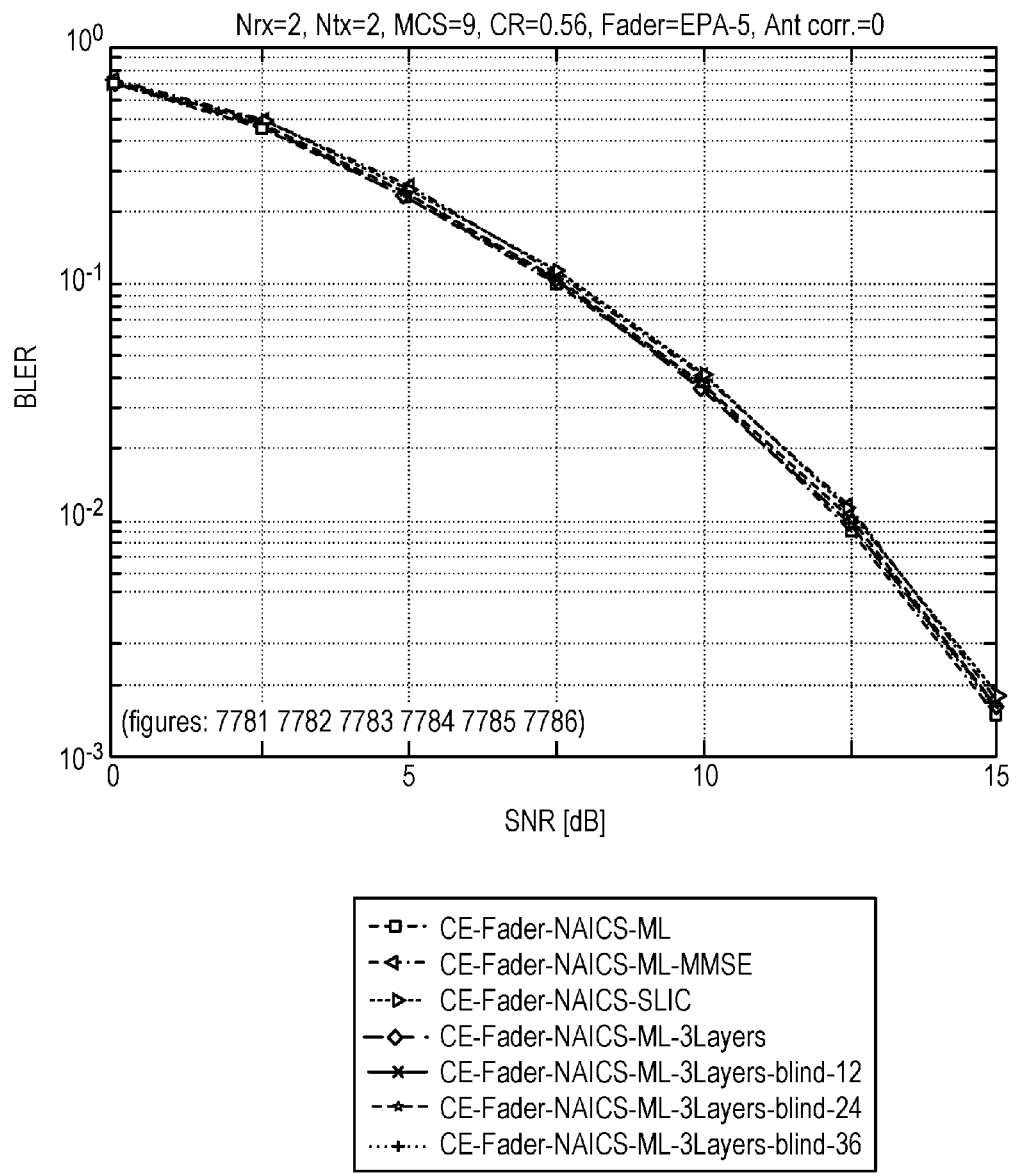
Figure 3R:
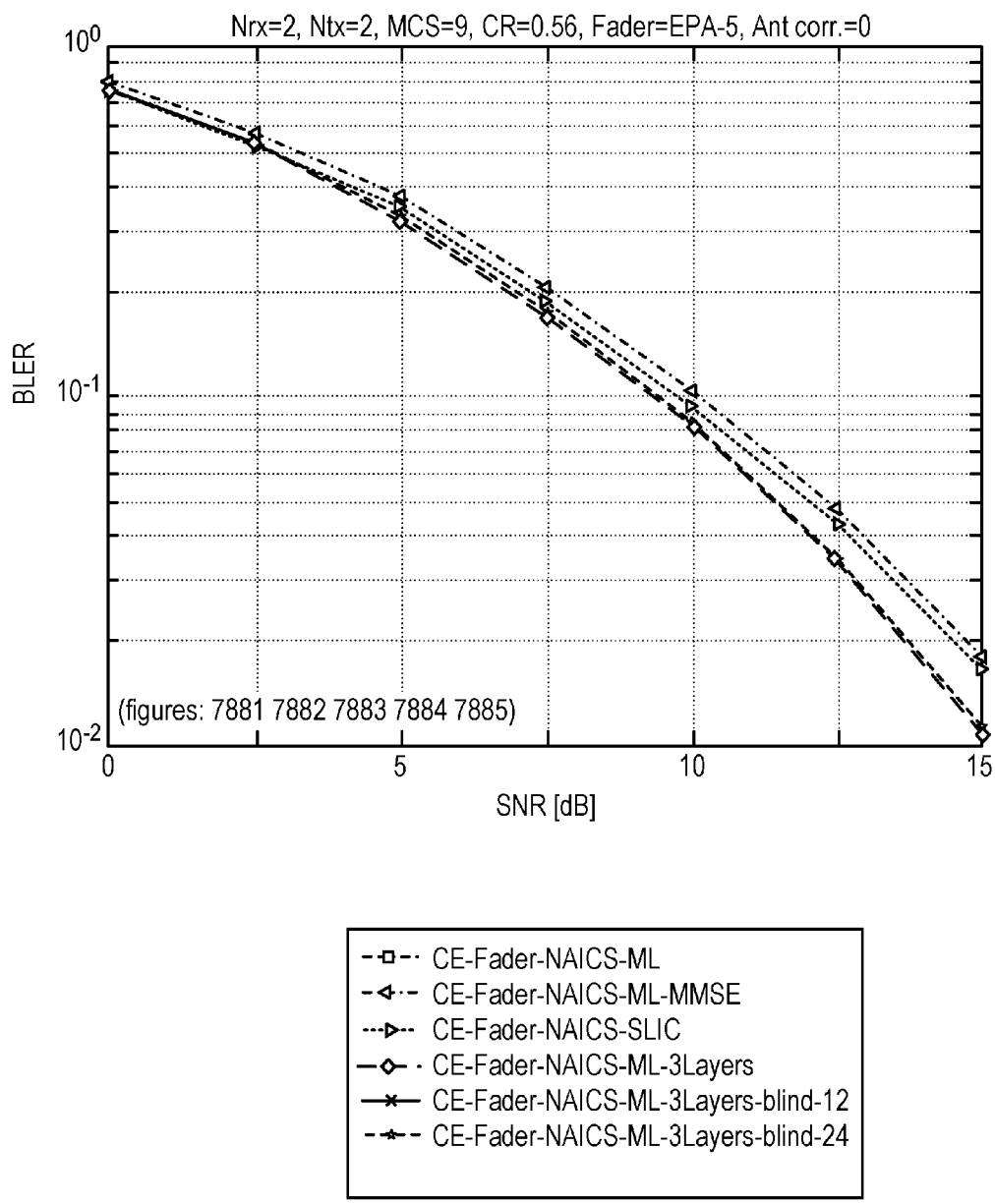

FIGS. 3a-r are graphs illustrating block error rate ("BLER") to signal-to-noise ratio ("SNR") in accordance with illustrative embodiments of the invention. FIGS. 3a-r demonstrate the performance of an adaptive demodulation scheme. The different lines in each of FIGS. 3a-r are related to different demodulation schemes.

CE-Fader-NAICS-ML may be a NAICS based maximum likelihood ("ML") decoder with joint decoding of the serving and the interference. Two layers may be used for a TM 4/4 combination and 4 layer may be used if the interferer or serving cell is in TM=2. When the interference has rank two it may be assumed that one of the layers is treated as noise and whitened so from the ML decoder perspective, and all tests may be with one interference layer. CE-Fader-NAICS-ML may assumes perfect knowledge of all interference parameters (no blind estimation).

CE-Fader-NAICS-MMSE may be a NAICS based Minimum Mean Square Error-Interference Rejection Combining ("MMSE-IRC") decoder with joint decoding of the serving and the interference. Interference parameters estimation for PA and modulation may not needed. The rest of the parameters may be assumed to be perfectly known. This scheme may be simulated mainly to ensure NAICS performance is always superior to it and meets the NAICS robustness requirements (that is, the performance should not be inferior to MMSE baseline receiver).

CE-Fader-NAICS-SLIC may be NAICS based symbol level interference cancellation ("SLIC") decoder with joint decoding of the serving and the interference. CE-Fader-NAICS-SLIC may assume perfect knowledge of all interference parameters (no blind estimation).

CE-Fader-NAICS-ML-3layers may be a NAICS based ML decoder with joint decoding of the serving and the interference. CE-Fader-NAICS-ML-3layers may have two layers for TM 4/4 combination and 3 layer if the interferer or serving BS is in TM=2 (the fourth layer is treated as noise and whitened). CE-Fader-NAICS-ML-3layers may assume perfect knowledge of all interference parameters (no blind estimation). This is the scheme implemented in the NAICS receiver architecture.

CE-Fader-NAICS-ML-3layers-blind-12 may be a decoding scheme with blind estimation of parameters using averaging over 12 sub-carriers per allocation per slot. The list of hypothesizes tested in the blind estimation phase is detailed as addition parameters, per FIGS. 3a-r.

CE-Fader-NAICS-ML-3layers-blind-24 may be a decoding scheme with blind estimation of parameters using averaging over 24 sub-carriers per allocation per slot. The list of hypothesizes tested in the blind estimation phase is detailed as addition parameters, per FIGS. 3a-r.

CE-Fader-NAICS-ML-3layers-blind-36 may be a decoding scheme with blind estimation of parameters using averaging over 36 sub-carriers per allocation per slot. The list of hypothesizes tested in the blind estimation phase is detailed as addition parameters, per FIGS. 3a-r.

Each line in FIG. 3a shows BLER to SNR for a different UE (e.g., the UE 101, 107 as described above in FIG. 1). The Fader, defining the propagation conditions used in each of these simulations, is an EPA-5. The "5" in EPA-5 stands for the maximum Doppler shift in Hz which defines the relative motions between the serving cell and the UE. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. Antenna correlation defines a measure of correlation between antenna elements in the serving cell and UE. The CR can be derived from the MCS and allocation size. The cellular communication signals received by each UE has a Transmission Mode (TM) of a serving cell (e.g., the serving cell 113 as described above in FIG. 1) equal to 2, a TM of the interfering cell (e.g., the interfering cell 115 as described above in FIG. 1) equal to 2, an INR of interference is 3.84 dB, an MCS of interference equal to 5 (QPSK), a blind detection hypothesis list equal to TM={2,9}, a modulation of QPSK, 16QAM, 64QAM, or 256QAM, and a PA is {0, −3, −6}.

Each line in FIG. 3b shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 2, a TM of the interfering cell (e.g., the interfering cell 115 as described above in FIG. 1) equal to 2, an INR of interference is 13.91 dB, an MCS of interference equal to 5 (QPSK), a blind detection hypothesis list equal to TM={2,9}, a modulation of QPSK, 16QAM, 64QAM, or 256QAM, and a PA is {0, −3, −6}.

Each line in FIG. 3c shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 2, a TM of the interfering cell (e.g., the interfering cell 115 as described above in FIG. 1) equal to 2, an INR of interference is 3.84 dB, an MCS of interference equal to 14 (16QAM), a blind detection hypothesis list equal to TM={2,9}, a modulation of QPSK, 16QAM, 64QAM, or 256QAM, and a PA is {0, −3, −6}.

Each line in FIG. 3*d* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 2, a TM of the interfering cell (e.g., the interfering cell 115 as described above in FIG. 1) equal to 2, an INR of interference is 13.91 dB, an MCS of interference equal to 14 (16QAM), a blind detection hypothesis list equal to TM={2,9}, a modulation of QPSK, 16QAM, 64QAM, or 256QAM, and a PA is {0, −3, −6}.

Each line in FIG. 3*e* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 2, a TM of the interfering cell (e.g., the interfering cell 115 as described above in FIG. 1) equal to 2, an INR of interference is 3.84 dB, an MCS of interference equal to 25 (64QAM), a blind detection hypothesis list equal to TM={2,9}, a modulation of QPSK, 16QAM, 64QAM, or 256QAM, and a PA is {0, −3, −6}.

Each line in FIG. 3*f* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 2, a TM of the interfering cell (e.g., the interfering cell 115 as described above in FIG. 1) equal to 2, an INR of interference is 13.91 dB, an MCS of interference equal to 25 (64QAM), a blind detection hypothesis list equal to TM={2,9}, a modulation of QPSK, 16QAM, 64QAM, or 256QAM, and a PA is {0, −3, −6}.

Each line in FIG. 3*g* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 2, a TM of the interfering cell (e.g., the interfering cell 115 as described above in FIG. 1) serving equal to 9, an INR of interference is 3.84 dB, an MCS of interference equal to 5 (QPSK), a blind detection hypothesis list equal to TM={2,9}, a modulation of QPSK, 16QAM, 64QAM, or 256QAM, and a PA is {0, −3, −6}.

Each line in FIG. 3*h* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 2, a TM of the interfering cell (e.g., the interfering cell 115 as described above in FIG. 1) serving equal to 9, an INR of interference is 13.91 dB, an MCS of interference equal to 5 (QPSK), a blind detection hypothesis list equal to TM={2,9}, a modulation of QPSK, 16QAM, 64QAM, or 256QAM, and a PA is {0, −3, −6}.

Each line in FIG. 3*i* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 2, a TM of the interfering cell (e.g., the interfering cell 115 as described above in FIG. 1) equal to 9, an INR of interference is 3.84 dB, an MCS of interference equal to 14 (16QAM), a blind detection hypothesis list equal to TM={2,9}, a modulation of QPSK, 16QAM, 64QAM, or 256QAM, and a PA is {0, −3, −6}.

Each line in FIG. 3*j* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 2, a TM of the interfering cell (e.g., the interfering cell 115 as described above in FIG. 1) equal to 9, an INR of interference is 13.91 dB, an MCS of interference equal to 14 (16QAM), a blind detection hypothesis list equal to TM={2,9}, a modulation of QPSK, 16QAM, 64QAM, or 256QAM, and a PA is {0, −3, −6}.

Each line in FIG. 3*k* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 2, a TM of the interfering cell (e.g., the interfering cell 115 as described above in FIG. 1) equal to 9, an INR of interference is 3.84 dB, an MCS of interference equal to 25 (64QAM), a blind detection hypothesis list equal to TM={2,9}, a modulation of QPSK, 16QAM, 64QAM, or 256QAM, and a PA is {0, −3, −6}.

Each line in FIG. 3*l* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 2, a TM of the interfering cell (e.g., the interfering cell 115 as described above in FIG. 1) equal to 9, an INR of interference is 13.91 dB, an MCS of interference equal to 25 (64QAM), a blind detection hypothesis list equal to TM={2,9}, a modulation of QPSK, 16QAM, 64QAM, or 256QAM, and a PA is {0, −3, −6}.

Each line in FIG. 3*m* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 4, a TM of the interfering cell (e.g., the interfering cell 115 as described above in FIG. 1) equal to 9, an INR of interference is 3.84 dB, an MCS of interference equal to 5 (QPSK), a blind detection hypothesis list equal to TM={2,9}, a modulation of QPSK, 16QAM, 64QAM, or 256QAM, and a PA is {0, −3, −6}.

Each line in FIG. 3*n* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 4, a TM of the interfering cell (e.g., the interfering cell 115 as described above in FIG. 1) equal to 9, an INR of interference is 13.91 dB, an MCS of interference equal to 5 (QPSK), a blind detection hypothesis list equal to TM={2,9}, a modulation of QPSK, 16QAM, 64QAM, or 256QAM, and a PA is {0, −3, −6}.

Each line in FIG. 3*o* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 4, a TM of the interfering cell (e.g., the interfering cell 115 as described above in FIG. 1) equal to 9, an INR of interference is 3.84 dB, an MCS of interference equal to 14 (16QAM), a blind detection hypothesis list equal to TM={2,9}, a modulation of QPSK, 16QAM, 64QAM, or 256QAM, and a PA is {0, −3, −6}.

Each line in FIG. 3*p* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 4, a TM of the interfering cell (e.g., the interfering cell 115 as described above in FIG. 1) equal to 9, an INR of interference is 13.91 dB, an MCS of interference equal to 14 (16QAM), a blind detection hypothesis list equal to TM={2,9}, a modulation of QPSK, 16QAM, 64QAM, or 256QAM, and a PA is {0, −3, −6}.

Each line in FIG. 3*q* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 4, a TM of the interfering cell (e.g., the interfering cell 115 as described above in FIG. 1) equal to 9, an INR of interference is 3.84 dB, an MCS of interference equal to 25 (64QAM), a blind detection hypothesis list equal to TM={2,9}, a modulation of QPSK, 16QAM, 64QAM, or 256QAM, and a PA is {0, −3, −6}.

Each line in FIG. 3*r* shows BLER to SNR for a different UE (e.g., the UE 101, 107 as described above in FIG. 1). The Fader, defining the propagation conditions used in each of these simulations, is an EPA-5. Each UE has an antenna correction (Ant corr.) equal to zero (0), a CR equal to 0.56, a number of transmission antennas (Ntx) equal to 2, a number of receive antennas (Nrx) equal to 2, and a modulation coding scheme (MCS) serving equal to 9. The cellular communication signals received by each UE has a Transmission Mode (TM) of a serving cell (e.g., the serving cell 113 as described above in FIG. 1) equal to 4, a TM of the interfering cell (e.g., the interfering cell 115 as described above in FIG. 1) equal to 9, an INR of interference is 13.91 dB, an MCS of interference equal to 25 (64QAM), a blind detection hypothesis list equal to TM={2,9}, a modulation of QPSK, 16QAM, 64QAM, or 256QAM, and a PA is {0, −3, −6}.

Method steps can be performed by one or more programmable processors (e.g., on a mobile device) executing a computer program to perform functions of the invention by operating on input data and generating output. Method steps can be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

It is apparent to one skilled in the art that the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for adaptive demodulation of cellular device communication signals, the method comprising:
   receiving, by a computing device, a cellular communication signal transmitted over a Long Term Evolution (LTE) network;
   determining, by the computing device, a serving cell transmission mode of the cellular communication signal;
   determining, by the computing device, an interfering cell transmission mode of the cellular communication signal;
   determining, by the computing device, a modulation order (QAM) of the interfering cell of the cellular communication signal;
   selecting, by the computing device, a demodulation scheme from a plurality of demodulation schemes based on the serving cell transmission mode, the interfering cell transmission mode, the modulation order (QAM) of the interfering cell, and an interference-to-noise ratio; and
   demodulating, by the computing device, the cellular communication signal with the selected demodulation scheme.

2. The method of claim 1 wherein the computing device is a processor within a cellular device.

3. The method of claim 2 wherein the cellular device comprises two radio frequency receive antennas.

4. The method of claim 1 wherein the plurality of demodulation schemes comprise a 3 layer demodulation scheme of the LTE network, 2 layer demodulation scheme of the LTE network, a 2×2 layer of the LTE network, or any combination thereof.

5. The method of claim 1 wherein selecting the demodulation scheme further comprises utilizing a look-up table.

6. A cellular device capable of adaptive demodulation of cellular communication signals, the cellular device comprising:
   at least two radio frequency receive antennas capable of receiving cellular communication signals transmitted over a Long Term Evolution (LTE) network;
   a processor configured to:
   receive the cellular communication from the at least two radio frequency receive antennas;
   determine a serving cell transmission mode of the cellular communication signal;
   determine an interfering cell transmission mode of the cellular communication signal;
   determine a modulation order (QAM) of the interfering cell of the cellular communication signal;
   select a demodulation scheme from a plurality of demodulation schemes based on the serving cell transmission mode, the interfering cell transmission mode, the modulation order (QAM) of the interfering cell, and an interference-to-noise ratio; and
   demodulate the cellular communication signal with the selected demodulation scheme.

7. The cellular device of claim 6 wherein the plurality of demodulation schemes comprise a 3 layer demodulation scheme of the LTE network, 2 layer demodulation scheme of the LTE network, a 2×2 layer of the LTE network, or any combination thereof.

8. The cellular device of claim 6 the processor is further configured select the demodulation scheme based on a look-up table.

9. A method for adaptive demodulation of cellular device communication signals, the method comprising:
   receiving, by a computing device, a cellular communication signal transmitted over a Long Term Evolution (LTE) network;
   determining, by the computing device, a serving cell transmission mode of the cellular communication signal;
   determining, by the computing device, an interfering cell transmission mode of the cellular communication signal;
   determining, by the computing device, a modulation order (QAM) of the interfering cell of the cellular communication signal;
   selecting, by the computing device, one demodulation scheme from the list consisting of: a 3 layer demodulation scheme of the LTE network, a 2 layer demodulation scheme of the LTE network, and a 2×2 layer of the LTE network, based on the serving cell transmission mode, the interfering cell transmission mode, the modulation order (QAM) of the interfering cell, and an interference-to-noise ratio; and
   demodulating, by the computing device, the cellular communication signal with the selected demodulation scheme.

* * * * *